United States Patent
Hsu et al.

(10) Patent No.: US 11,360,958 B2
(45) Date of Patent: Jun. 14, 2022

(54) TECHNIQUES FOR INDEXING AND QUERYING A SET OF DOCUMENTS AT A COMPUTING DEVICE

(71) Applicant: Apple Inc., Cupertino, CA (US)

(72) Inventors: Kevin Hsu, Pleasanton, CA (US); Ling Wang, Foster City, CA (US); Justus A. Calvin, Emeryville, CA (US); Christopher S. Adams, San Leandro, CA (US)

(73) Assignee: Apple Inc., Cupertino, CA (US)

( * ) Notice: Subject to any disclaimer, the term of this patent is extended or adjusted under 35 U.S.C. 154(b) by 22 days.

(21) Appl. No.: 16/105,535

(22) Filed: Aug. 20, 2018

(65) Prior Publication Data
US 2019/0102413 A1 Apr. 4, 2019

Related U.S. Application Data

(60) Provisional application No. 62/565,462, filed on Sep. 29, 2017.

(51) Int. Cl.
| | | |
|---|---|---|
| *G06F 17/30* | (2006.01) | |
| *G06F 16/22* | (2019.01) | |
| *G06F 16/93* | (2019.01) | |
| *G06F 16/31* | (2019.01) | |

(52) U.S. Cl.
CPC ........ *G06F 16/2237* (2019.01); *G06F 16/313* (2019.01); *G06F 16/93* (2019.01)

(58) Field of Classification Search
CPC .. G06F 16/313; G06F 16/9535; G06F 16/951; G06F 16/3323; G06F 16/355; G06F 16/3326; G06F 16/334
See application file for complete search history.

(56) References Cited

U.S. PATENT DOCUMENTS 5,630,117 A * 5/1997 Oren ...................... G06F 16/94
715/204
6,507,839 B1 * 1/2003 Ponte ................. G06F 16/9535
(Continued)

FOREIGN PATENT DOCUMENTS

WO WO2016209952 * 12/2016

OTHER PUBLICATIONS

"Integration of Probabilistic Fact and Text Retreival", Norbert Fahr, ACM 1992.*

*Primary Examiner* — Daniel A Kuddus
(74) *Attorney, Agent, or Firm* — Aikin & Gallant, LLP

(57) ABSTRACT

This application relates to a technique that enables efficient indexing and querying of a set of documents stored at a computing device. The technique assigns a rank to each term of a set of terms based on a historical occurrence of each term to produce a set of ranked terms. The technique also creates subsets that include terms from the set of ranked terms to produce ranked term subsets that are encoded in accordance with an allocated bit size. The technique generates an index for each document of the set of documents through: (1) the identification of the ranked term subsets within the document, (2) the generation of arrays to store each ranked term subset identified within the document, and (3) the embedding of metadata within the document. The metadata includes: (i) one or more arrays and (ii) one or more counts corresponding to each array.

17 Claims, 31 Drawing Sheets

(56) References Cited

U.S. PATENT DOCUMENTS

| | | | | |
|---|---|---|---|---|
| 7,283,997 B1* | 10/2007 | Howard, Jr. | ........ | G06F 16/9535 |
| | | | | 707/999.005 |
| 7,289,985 B2* | 10/2007 | Zeng | .................... | G06F 16/951 |
| | | | | 707/749 |
| 7,725,424 B1* | 5/2010 | Ponte | .................. | G06F 16/9535 |
| | | | | 707/715 |
| 8,051,080 B2 | 11/2011 | Kraft et al. | | |
| 8,095,533 B1* | 1/2012 | Ponte | .................. | G06F 16/9535 |
| | | | | 707/753 |
| 8,171,031 B2* | 5/2012 | Tankovich | ............ | G06F 16/951 |
| | | | | 707/711 |
| 9,280,595 B2* | 3/2016 | Edwards | ............... | G06F 16/316 |
| 9,424,317 B2 | 8/2016 | Hu et al. | | |
| 2006/0010126 A1 | 1/2006 | Anick et al. | | |
| 2010/0121838 A1* | 5/2010 | Tankovich | ............ | G06F 16/951 |
| | | | | 707/723 |
| 2012/0284253 A9* | 11/2012 | Ghosh | .................. | G06F 16/242 |
| | | | | 707/711 |
| 2014/0067846 A1* | 3/2014 | Edwards | ........... | G06F 16/24578 |
| | | | | 707/765 |
| 2014/0126532 A1* | 5/2014 | Bapat | .................... | H04W 76/25 |
| | | | | 370/331 |
| 2014/0136532 A1* | 5/2014 | Ponte | .................... | G06F 16/313 |
| | | | | 707/730 |
| 2015/0161265 A1 | 6/2015 | Shen et al. | | |
| 2016/0171091 A1* | 6/2016 | Edwards | ............. | G06F 16/3325 |
| | | | | 707/750 |
| 2016/0378769 A1* | 12/2016 | Hopcroft | ............... | G06F 16/325 |
| | | | | 707/730 |
| 2016/0378805 A1* | 12/2016 | Hopcroft | ............. | G06F 16/2272 |
| | | | | 707/715 |

\* cited by examiner

| TERM RANKINGS TABLE 202 ||
|---|---|
| TOKENIZED TERM | TERM ID |
| THE | 1 |
| A | 2 |
| AND | 3 |
| ON | 4 |
| ALL | 5 |
| IN | 6 |
| HAD | 7 |
| SAT | 8 |
| MEN | 9 |
| TOGETHER | 10 |
| PUT | 11 |
| COULDN'T | 12 |
| AGAIN | 13 |
| FALL | 14 |
| GREAT | 15 |
| WALL | 16 |
| WENT | 17 |
| TO | 18 |
| UP | 19 |
| OF | 20 |
| AFTER | 21 |
| BROKE | 22 |
| COME | 23 |
| DOWN | 24 |
| HIS | 25 |
| MOST | 26 |
| PLACE | 27 |
| WITH | 28 |
| GO | 29 |
| ⋮ | ⋮ |

Encoded First Bit-Level Terms 200

*FIG. 2A*

| TERM RANKINGS TABLE 202 ||
|---|---|
| TOKENIZED TERM | TERM ID |
| ⋮ | ⋮ |
| VISIT | 257 |
| HORSES | 258 |
| BEAUTIFUL | 259 |
| KING | 260 |
| HUMPTY | 261 |
| DUMPTY | 262 |
| FETCH | 263 |
| TUMBLING | 264 |
| HILL | 265 |
| WATER | 266 |
| PAIL | 267 |
| CROWN | 268 |
| JACK | 269 |
| WORLD | 270 |
| JILL | 271 |
| SAN FRANCISCO | 272 |
| TRIP | 273 |
| ⋮ | ⋮ |

Encoded Second Bit-Level Terms 204

*FIG. 2B*

Interleaved Encoded Terms 206

| TERM RANKINGS TABLE 202 ||
|---|---|
| TOKENIZED TERM | TERM ID |
| ⋮ | ⋮ |
| VISIT | 257 |
| HORSES | 258 |
| BEAUTIFUL | 259 |
| KING | 260 |
| ⋮ | ⋮ |
| JACK AND JILL | 280 |
| IN THE WORLD | 281 |
| ⋮ | ⋮ |

*FIG. 2C*

| DOCUMENTS TABLE 208 ||
|---|---|
| DOCUMENT ID | DOCUMENT SOURCE |
| ⋮ | ⋮ |
| 210 | local/rhymes/humpty.html |
| 212 | local/rhymes/jackandjill.pdf |
| 214 | local/travel/sanfrancisco.key |
| ⋮ | ⋮ |

*FIG. 2D*

| INDEXED DOCUMENT TABLE 402 | | |
|---|---|---|
| INDEX ID | DOCUMENT ID | STORED METADATA |
| ... | ... | ... |
| 404 | 210 | BIT-LEVEL COUNT DATA 310:[15] [4];<br>ARRAY 316: [THE(16, 21), A(5, 11), AND(19), ON(4), ALL(15, 20), HAD(10), SAT(3), MEN(23), TOGETHER(27), PUT(25), COULDN'T(24), AGAIN(28), FALL(13), GREAT(12), WALL(6)]<br>ARRAY 322: [HORSES(18), KING(17, 22), HUMPTY(1, 8, 26), DUMPTY(2, 9)] |
| 406 | 212 | BIT-LEVEL COUNT DATA 334:[13] [7];<br>ARRAY 340: [THE(6), A(10), AND(2, 18, 24), FELL(16), WENT(4), TO(8), UP(5), OF(12), AFTER(28), BROKE(20), CAME(26), DOWN(17), HIS(20)];<br>ARRAY 342: [FETCH(9), TUMBLING(27), HILL(7), WATER(13), PAIL(11), JACK(1, 15), JILL(3, 24)] |
| 408 | 214 | BIT-LEVEL COUNT DATA 350:[6] [5];<br>ARRAY 356: [THE(6, 11), IN(10), COME(1), MOST(7), PLACE(9), GO(14)];<br>ARRAY 358: [VISIT(2), BEAUTIFUL(8), WORLD(12), SAN FRANCISCO(4), TRIP(17)] |

*FIG. 4*

TECHNIQUES FOR INDEXING AND QUERYING A SET OF DOCUMENTS AT A COMPUTING DEVICE

CROSS-REFERENCE TO RELATED APPLICATIONS

The present application claims the benefit of U.S. Provisional Application No. 62/565,462, entitled "TECHNIQUES FOR INDEXING AND QUERYING A SET OF DOCUMENTS AT A COMPUTING DEVICE," filed Sep. 29, 2017, the content of which is incorporated herein by reference in its entirety for all purposes.

FIELD OF INVENTION

The described embodiments relate generally to document indexing/querying techniques. More particularly, the present embodiments relate to techniques that can index a set of documents based on the identification of specific types of terms.

BACKGROUND

When a user is interested in searching for a document pertaining to a particular subject, the user can type one or more search terms in the text field of a search engine to identify all relevant documents that pertain to the search terms. Upon receipt of the search terms, the search engine scans a collection of documents that may potentially include the search terms. Using an "inverted index," the search engine can query the collection of documents to identify those documents that include the search terms. As part of the process, the inverted index initially maps each search term to a corresponding set of one or more documents that the search engine identified as including the search term. The inverted index then enables the search engine to identify each document that is shared by a pair of search terms and creates a subset of those particular documents. The process of creating subsets in this fashion is an iterative process that ultimately results in a listing of documents identified by the search engine as being relevant to the requested search terms.

However, search engines that use an inverted index to query large amounts of documents (e.g., several million documents) can take several milliseconds to generate search results if one or more search terms include commonly used terms, such as "the," "in," "and," or similar frequently-used terms. The frequent use of such terms in documents can require the search engine to scan several millions of documents at the expense of search terms that may not occur as frequently, such as, "Obama," "California," "Smithsonian", or similar infrequently-used terms. Performing scans in this manner can unfortunately increase the amount of time spent on performing the aforementioned subset operations. Additionally, search engines that need to process several millions of queries on several millions of documents (e.g., one million queries per second) generally consume a great deal of central processing unit (CPU) resources to perform even basic searches that include a combination of infrequently-used terms and frequently-used terms. Thus, in order to perform a search within a reasonable time, conventional solutions that use an inverted index will not work.

SUMMARY

Accordingly, the representative embodiments set forth herein disclose techniques that can enable a computing device to index/query a set of documents that are accessible to the computing device.

One embodiment sets forth a method for indexing a set of documents stored at at least one computing device. In particular, the method includes, at the at least one computing device, a first step of assigning a rank to each term of a set of terms based at least in part on a historical occurrence of each term to produce a set of ranked terms. Next, the method involves creating a plurality of subsets including one or more ranked terms from the set of ranked terms to produce a plurality of ranked term subsets, in which each ranked term subset is encoded in accordance with an allocated bit size. Finally, the method involves generating an index for each document of the set of documents by: (i) identifying the plurality of ranked term subsets within the document, (ii) generating one or more arrays to store each ranked term subset identified within the document and (iii) embedding metadata within the document, in which the metadata includes at least: (i) the one or more arrays and (ii) one or more counts corresponding to the one or more arrays, in which each count represents a number of ranked terms stored by a respective array of the one or more arrays.

One embodiment sets forth a method for querying an indexed set of documents stored at at least one computing device. In particular, the method includes, at the at least one computing device, a first step of receiving a query that includes one or more ranked terms from a set of ranked terms, in which the set of ranked terms are ranked based at least in part on a historical occurrence of a set of terms. Next, the method involves accessing a data structure based at least in part on receipt of the query, in which the data structure includes: (1) a document identifier for each document of the indexed set of documents, in which each document includes: metadata embedded within the document. The metadata includes: (i) at least one array that stores one or more ranked terms from a respective ranked term subset, from a plurality of ranked term subsets, identified within the document, in which each ranked term subset from the plurality of ranked term subsets is a different subset of the set of ranked terms and each ranked term subset is encoded in accordance with an allocated bit size and (ii) one or more counts corresponding to the least one array, in which each count represents a number of ranked terms stored by the least one array and at least one ranked term identified within each document of the indexed set of documents is based at least in part on a particular ranked term subset. Finally, the method involves selecting, from the data structure, a subset of the indexed set of documents, in which the subset of the indexed set of documents includes: (i) one or more document identifiers, and (ii) the at least one ranked term matching the query.

Other embodiments include at least one computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIGS. 2A-2C illustrate exemplary term ranking/encoding procedures that can be performed to index a set of documents, according to some embodiments.

FIG. 2D illustrates an exemplary data structure that can be used to store documents for use in indexing/querying a set of documents, according to some embodiments.

FIG. 4 illustrates exemplary indexing procedures to generate indexes for one or more documents, according to some embodiments.

FIGS. 7A-7I illustrate yet another set of procedures for processing a search query using a set of indexed documents, according to some embodiments.

DETAILED DESCRIPTION

Figure 1:
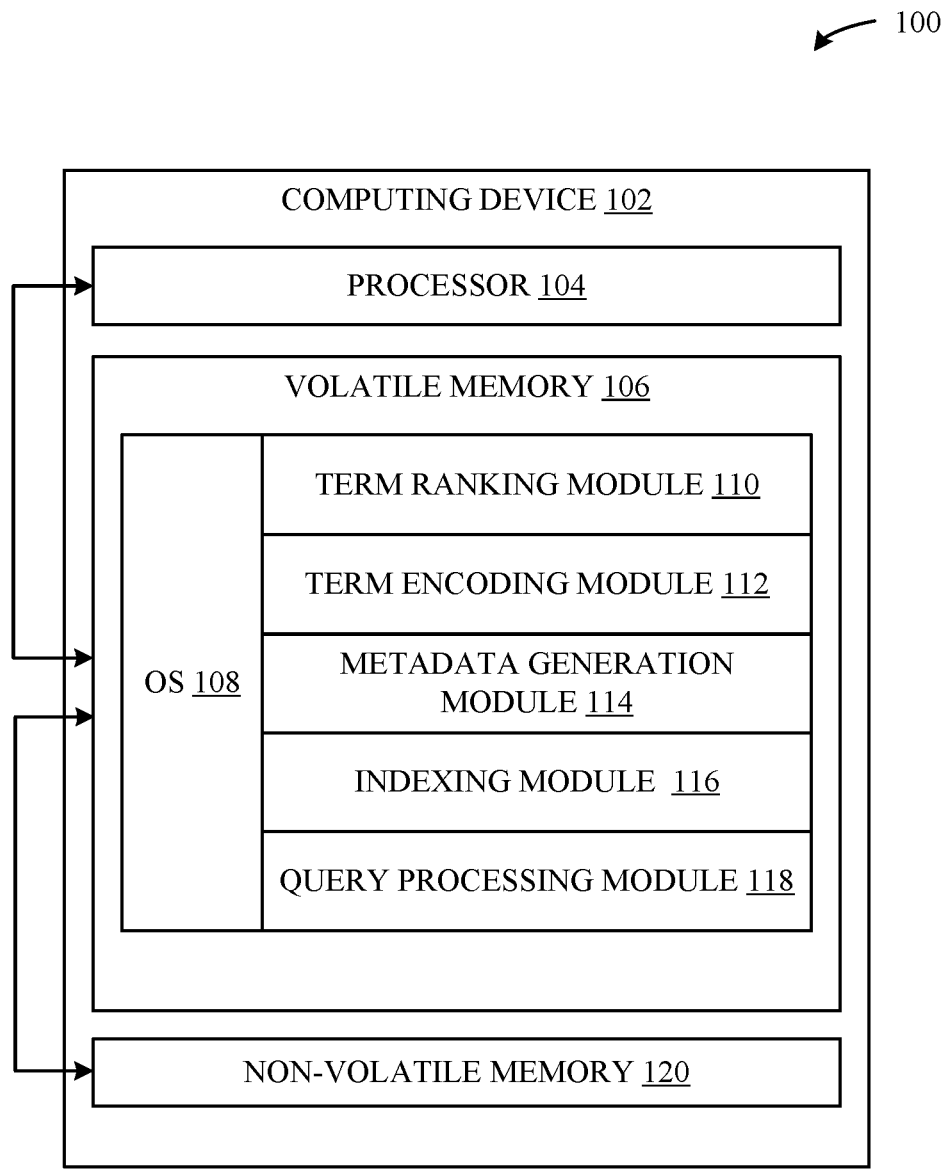
FIG. 1 illustrates an overview of a system that can be configured to perform the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments can be practiced without some or all of these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments can be used, and changes can be made without departing from the spirit and scope of the described embodiments.

As previously described herein, conventional solutions can take several milliseconds to generate search results if one or more search terms include frequently-used terms. To cure this deficiency, the embodiments set forth herein provide various techniques that advantageously index documents in a manner that allows one or more search terms from a search query to be quickly identified. As will be described in greater detail herein, the described embodiments allow one or more documents to be introspected in a manner that quickly determines (1) whether a particular document includes a specific search term and (2) the position of the specific search term within the particular document. In turn, the described embodiments can display search results within a much more satisfactory period of time compared to conventional solutions.

For instance, the described embodiments assign a rank to each term of a set of tokenized terms received from a tokenizer. The tokenized terms can include single-word terms (e.g., "the," "and," "in," "Jack"), multiple-word terms (e.g., "Humpty Dumpty"), terms expressed as phrases (e.g., "piece of cake"), and so on. The rank assigned to a particular tokenized term can be based on the general usage of the particular tokenized term within a set of one or more documents relative to other tokenized terms. For instance, the term "the" is generally present in almost every document, whereas a term such as "Humpty Dumpty" is generally limited to a smaller set of documents (e.g., document associated with nursery rhymes).

In this fashion, the tokenized term "the" can receive a higher rank than the tokenized term "Humpty Dumpty." Accordingly, the embodiments described herein create different classes of ranked tokenized terms in which one particular class represents one or more tokenized terms that are generally present in most documents (e.g., tokenized terms similar to the term "the" such as "on," "in," "of," "a," and so on) and a different class represents one or more tokenized terms that are generally not present in documents (e.g., tokenized terms similar to "Humpty Dumpty" such as "Jack," "Jill," "San Francisco," and so on). Using this distinction, each class is encoded in accordance with a particular bit-level in which each bit-level represents a number of bits that are greater than one. For instance, a popular class of tokenized terms can be encoded in accordance with a first bit-level (e.g., eight bits or one byte), whereas a less popular class can be encoded in accordance with a second bit-level (e.g., sixteen bits or two bytes)

Using ranks/classifications in the manner described herein, the described embodiments perform efficient forward indexing procedures by creating an index for each document of a set of documents available for processing a search query. The indexes include information stored in metadata, embedded by the described embodiments into each document, for use in quickly identifying one or more documents that are relevant to a search query. For instance, the metadata information includes bit-level counts for different bit-levels that are present within a document.

The bit-level counts are used to quickly determine how many different tokenized terms, ranked by the described embodiments, are represented within a particular document. In one example, if a particular document includes the search terms "Humpty Dumpty," "Jack," and "Jill," (each being terms that are encoded in accordance with a second bit-level), the metadata included within the document can indicate that the document includes three (3) second bit-level terms. In this fashion, during the processing of a search query that includes the search terms "Humpty Dumpty," "Jack," and "Jill," a document that includes metadata indicating that the document fails to include any second bit-level terms can be quickly bypassed in favor of the aforementioned document that includes the three (3) second bit-level terms.

In addition to the bit-level counts, the metadata includes one or more arrays to store tokenized terms ranked by the described embodiments. In this manner, each array is used to store one or more tokenized terms that are associated with a particular bit-level. For instance, the document that includes the three (3) second bit-level terms can include a specific array that stores the tokenized terms "Humpty Dumpty," "Jack," and "Jill," as well as any other second bit-level terms that are present in the document. Additionally, in a similar manner, the document can also include a separate array that stores first bit-level terms that are present in the document.

As will be described in greater detail herein, the use of arrays enables the described embodiments to perform a search to quickly locate a particular search term when processing a search query. For instance, given that the exemplary document described above includes a second bit-level count of three (3), the described embodiments can perform a search on the corresponding array that stores the three (3) second bit-level terms to quickly determine if the document includes the search terms "Humpty Dumpty," "Jack," and "Jill," rather than performing an entire scan of the document using conventional techniques. Given that the document does, in fact, include the search terms "Humpty Dumpty," "Jack," and "Jill," the described embodiments also gather positional information associated with each term within the document for use in displaying the location of the search terms within the document when presenting the search results to a user.

As will be described herein, a document identifier and corresponding embedded metadata information for each document is stored within a data structure. In this fashion, the data structure can store, for each document, (1) array data, (2) bit-level count data, as well as the aforementioned positional information of each tokenized terms that is relevant to the search query. Thus, when processing a search query, the described embodiments can quickly retrieve any relevant search terms by simply analyzing the information included in each index stored in the data structure. Accordingly, the various indexing/query processing techniques described by the embodiments set forth herein can process several millions of queries on several millions of documents within a reasonable time and in an efficient manner that cannot be achieved by conventional solutions.

A more detailed description of the various techniques described herein, and the manner in which they can be implemented, is provided below in conjunction with FIGS. 1, 2A-2D, 3A-3C, 4, 5A-5H, 6A-6F, 7A-7I, 8, 9A-9E, and 10.

Figure 10:
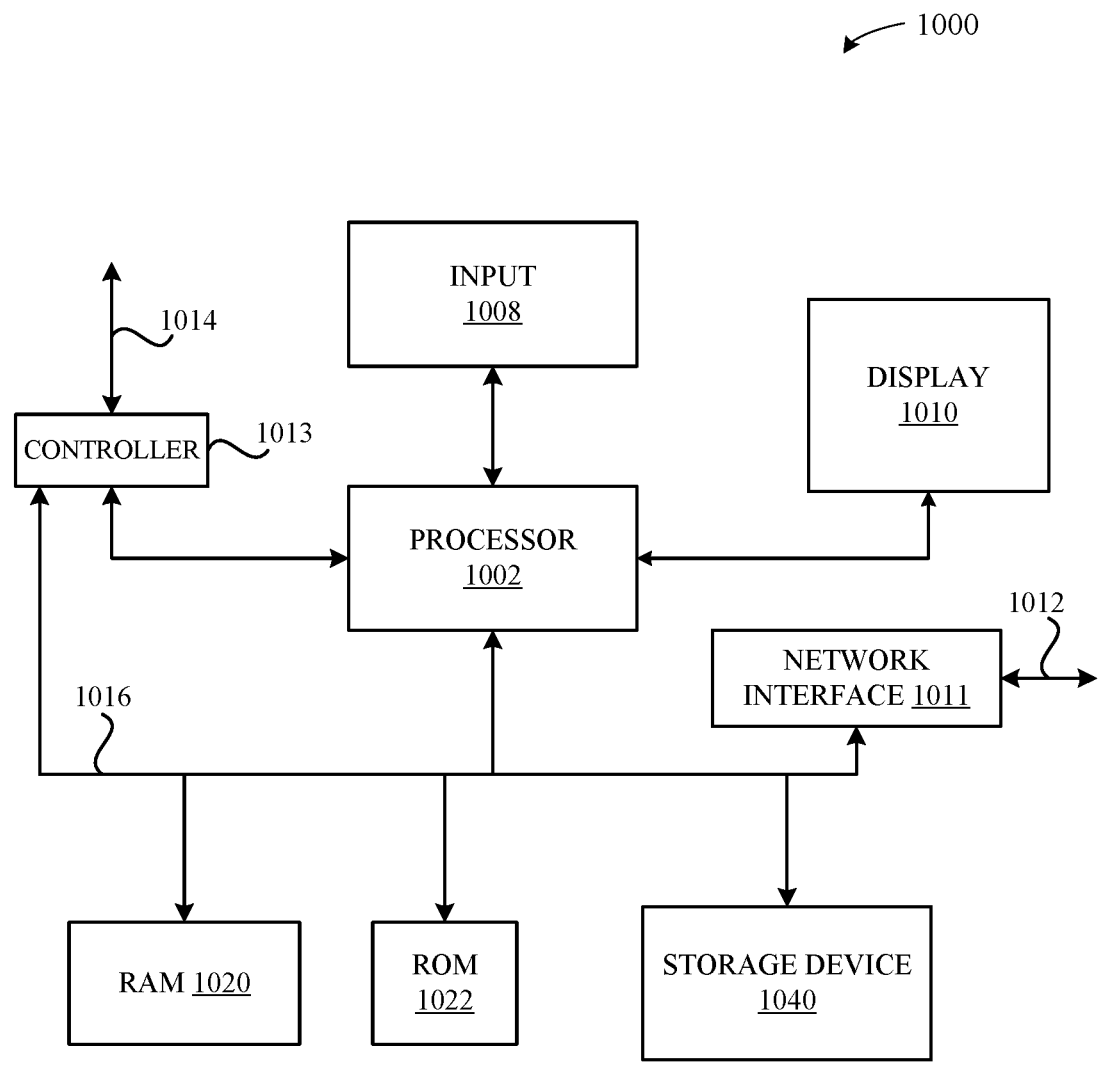
FIG. 10 illustrates a detailed view of a computing device that can be used to implement the various techniques described herein, according to some embodiments.

FIG. 1 illustrates a high-level overview 100 of a computing device 102 that can be configured to perform the various techniques described herein. As shown in FIG. 1, the computing device 102 can include a processor 104, a volatile memory 106 (e.g., a Random-Access Memory (RAM)), and a non-volatile memory 120 (e.g., a storage device). It is noted that a more detailed breakdown of example hardware components that can be included in the computing device 102 is illustrated in FIG. 10, and that these components are omitted from the illustration of FIG. 1 merely for simplification purposes. For example, the computing device 102 can include additional non-volatile memories (e.g., solid state drives, hard drives, etc.), other processors (e.g., a multi-core central processing unit (CPU)), and the like. According to some embodiments, an operating system (OS) 108 can be loaded at the volatile memory 106, where the OS 108 can be enabled to execute a variety of applications that enable the various techniques described herein to be implemented. As described in greater detail herein, such applications can include a term ranking module 110, a term encoding module 112, a metadata generation module 114, an indexing module 116, and a query processing module 118.

According to some embodiments, the term ranking module 110 includes the functionality to assign ranks to a set of tokenized terms received, by the computing device 102, from a tokenizer. In this fashion, the term ranking module 110 can produce one or more ranked tokenized terms from the set of tokenized terms. For instance, after populating a data structure (e.g., a term ranking table which will be described in FIGS. 2A-C) with tokenized terms received from the tokenizer, the term ranking module 110 can rank each tokenized term by assigning each tokenized term to a specific term identifier. In this fashion, and as will be discussed in greater detail in FIGS. 2A-2C, each term identifier represent a general usage (or "popularity") rank of a corresponding tokenized term based on how frequently the term appears within a set of one or more documents. Determinations concerning the manner in which certain tokenized terms are assigned to certain term identifiers can be based on current term usage trends. According to some embodiments, the term ranking module 110 can periodically receive a new set of tokenized terms that reflect a current term usage trend and produce a new set of ranked tokenized terms. Additionally, as will be discussed in greater detail herein, each tokenize term, stored in the data structure, can be encoded by the term encoding module 112, which will now be discussed in greater detail.

According to some embodiments, the term encoding module 112 includes the functionality to encode each tokenized term by mapping source symbols to a variable number of bits or bytes through the use of procedures such as variable-length coding or similar procedures. Examples of variable-length coding procedures used by embodiments described herein can include, but are not limited to, Huffman coding, Lempel-Ziv coding (e.g., LZ77, LZ78), arithmetic coding, and so on. As will be discussed in greater detail in FIGS. 2A-2C, the term encoding module 112 can selectively encode a set of ranked tokenized terms, produced by the term ranking module 110, in accordance with a particular number of bits, where the number of bits is at least greater than one. In this fashion, the term encoding module 112 can create different classes or levels of ranked tokenized terms to enable a more efficient search for a particular search term.

For instance, as will be described in greater detail herein, the term encoding module 112 can classify different sets of one or more ranked tokenized terms in accordance with different bit-levels. For example, the term encoding module 112 can classify a first set of ranked tokenized terms in accordance with a first number of bits (i.e., a "first bit-level"), a second set of ranked tokenized terms in accordance with a second number of bits (i.e., a "second bit-level"), a third set of ranked tokenized terms in accordance with a third number of bits (i.e., a "third bit-level"), and so on. In this fashion, according to some embodiments, each bit-level can feature a larger number of bits relative to a lower bit-level. For instance, a "first" bit-level set of terms can include fewer bits (e.g., eight bits) than a "second" bit-level set of terms (e.g., sixteen bits), and so on. In this manner, according to some embodiments, the described embodiments can be configured to encode a first set of one or more tokenized terms in accordance with a single ("S") byte type (i.e., one byte), a second set of one or more tokenized terms in accordance with a double ("D") byte type (i.e., two bytes), and so on. For simplification purposes, the embodiments set forth herein describe the different classifications associated with ranked tokenized terms as a "first" bit-level, a "second" bit-level, and so on. By performing classifications in the described manner, the term encoding module 112 can enable the metadata generation module 114 to quickly associate a specific ranked tokenized term with a particular bit-level, which now be discussed in greater detail.

According to some embodiments, the metadata generation module 114 includes the functionality to use resultant data generated by the term ranking module 110/the term encoding module 112 to produce embeddable metadata for a given document. As will be described in greater detail herein, the metadata generation module 114 generates metadata that can include one or more bit-level counts for different bit-levels that each track a number bit-levels present in a document. In addition, the metadata can include one or more arrays that store each ranked term that is present within a document. In this fashion, different arrays can be used to store one or more ranked terms associated with different encoded bit-levels (e.g., a first array for a first bit-level, a second array for a second bit-level, a third array for a third bit-level, and so on). Furthermore, as will be described in greater detail herein, the arrays can also store positional information for each ranked term stored therein. For instance, according to some embodiments, the positional information can include position offset values for each term that is present in a particular document. In this fashion, the metadata generation module 114 can, for ranked tokenized terms that appear multiple times with a given a document, identify each individual position occupied by each particular ranked tokenized term. Using the metadata created by the metadata generation module 114, the indexing module 116 can, in turn, create one or more indexes, which will now be discussed in greater detail.

According to some embodiments, the indexing module 116 includes the functionality to generate and store indexes, within a data structure, for one or more documents made accessible to the computing device 102. As will be described in greater detail in FIG. 4, the indexing module 116 can create an index by associating one or more ranked tokenized terms with a particular document. For instance, the indexing module 116 can access embedded metadata included in each document and store the contents therein within the data structure. Accordingly, each index created by the indexing module 116 can include (1) bit-level count data, (2) one or more arrays that each store one or more ranked tokenized terms that are present within the document, and (3) positional information of each ranked tokenized term stored by each array. Furthermore, the indexes created by the indexing module 116 can be used by the query processing module 118 to process a search query, as will now be discussed in greater detail.

According to some embodiments, the query processing module 118 includes the functionality to process one or more search terms received by the computing device 102 as input into a search query. According to some embodiments, the search terms can be received by the computing device 102 via a text input field displayed to a user through a browser. As will be described in greater detail in FIGS. 5A-5H, 6A-6F, and 7A-7I, upon receipt of one or more search terms, the query processing module 118 can analyze data included in one or more indexes created by the indexing module 116 in order to determine whether a particular search term is present within a particular document.

In particular, the query processing module 118 can perform search operations on one or more arrays storing ranked tokenized terms in order to determine whether a particular array stores a particular search term. In this fashion, the query processing module 118 can quickly and efficiently determine whether a particular document includes one or more search terms without scanning the entire document. Additionally, as will be described in greater detail herein, the query processing module 118 can gather the positional information of each search term as they appear within the document, as stored by a particular array. Furthermore, the query processing module 118 can store search results of a given search query within a data structure (e.g., a query results table) which can include each search term identified within a set of searched documents along with their respective positions within their respective documents.

It should be appreciated that the various components/modules described herein are not necessarily limited to their respective locations as depicted in FIG. 1. For instance, according to some embodiments, the term ranking module 110, the term encoding module 112, the metadata generation module 114, the indexing module 116 and/or the query processing module 118 can reside in non-volatile memory 120 and/or other storage mediums that can be coupled to the computing device 102. It should also be noted that use of the term "document" herein is not meant to be limiting and can include any type of word processing document, spreadsheet, presentation document, message, text, and the like. Documents described herein can also include searchable videos, audio files, images, and the like. Additionally, documents can be made accessible to the computing device 102 either locally (e.g., accessible via a local document storage system) or remotely (e.g., a remote server-based document storage system, a cloud-based document storage system, and so on). It should also be noted that the various documents depicted herein are not limited to documents written in English, and may be include documents written in other languages. Also, it should also be noted that use of the term "metadata" herein is not meant to be limiting and can include any type of data that provides information concerning the contents of a document for use in performing the querying/searching procedures described herein.

Additionally, it should be noted that the searching procedures described herein are not meant to be limiting and can include various types searches including, but not limited to, text file searches, multi-media file searches, image file searches, and the like. Additionally, it should be noted that the term "search" as used herein is not meant to be limiting and can include various types of searches capable of detecting the presence of a term within a data structure that include, but are not limited to, brute force searching, binary searching, sorting, hashing, and the like. Furthermore, it should be noted that, according to some embodiments, the various data structures described herein can store hash table computations. In this fashion, the various components described herein can include the functionality to access a hash map that can map one or more keys to different values stored within a particular data structure.

Accordingly, FIG. 1 provides a high-level overview of different hardware/software architectures that can be implemented by computing device 102 in order to carry out the various techniques described herein. A more detailed breakdown of these techniques will now be provided below in conjunction with FIGS. 2A-2D, 3A-3C, 4, 5A-5H, 6A-6F, 7A-7I, 8, 9A-9E, and 10. As described in greater detail below, these components can be utilized to assist in the performance of various indexing/querying procedures that can result in the display of relevant search results within a relatively short period of time.

FIGS. 2A-2C illustrate exemplary term ranking/encoding procedures that can be performed to index a set of documents, according to some embodiments. For instance, as illustrated in FIG. 2A, a term rankings table 202 can store various types of information associated with one or more tokenized terms. According to some embodiments, the computing device 102 can populate the term rankings table 202 using one or more tokenized terms received by a tokenizer (not depicted in FIGS. 2A-2C). Upon receipt of the one or more tokenized terms, the term ranking module 110 assigns each tokenized term to a specific term identifier ("term ID"). According to some embodiments, each term ID is assigned to a specific tokenized term based on the popularity of the tokenized term within any given document. In this fashion, the popularity of a particular tokenized term can be based on the frequency of a set of one or more documents in which the particular tokenized term typically appears in different documents. For example, given that the term "the" typically appears at least once in most documents, the term "the" is assigned a term ID of "1" in the terms ranking table 202. Next, the term "a" can be assigned a term ID of "2" in the terms ranking table 202 given that it also typically appears in most documents, however, not at the rate in which the term "the" appears, and so on. In this fashion, according to some embodiments, the term IDs described herein can be arranged in order of decreasing frequency in which the term "the" is the most frequently occurring term in a set of multiple documents, followed by the term "a," and so on. Using this methodology, each tokenized term depicted in FIGS. 2A-2C can receive a specific term ID.

Furthermore, as depicted in FIGS. 2A-2C, each tokenized term can be encoded in accordance with a particular bit-level. For instance, as illustrated in FIG. 2A, encoded first bit-level terms 200 include term IDs 1-29 which are each encoded by the term encoding module 112 in accordance with a first bit-level (e.g., eight bits). Additionally, those terms not included in the set of tokenized terms encoded in accordance with the first bit-level can be encoded in accordance with a different bit-level. For instance, as illustrated in FIG. 2B, encoded second bit-level terms 204 include term IDs 257-273 which are each encoded by the term encoding module 112 in accordance with a second bit-level (e.g., sixteen bits). It should be appreciated that a tokenized term stored in the term rankings table 202 can include two or more words. For instance, as illustrated by the interleaved encoded terms 206 depicted in FIG. 2C, "Jack and Jill" and "in the world" can each be considered a single term, interleaved with single-word terms, for purposes of processing by the embodiments described herein. In this manner, it should also be appreciated that a tokenized term stored in the term rankings table 202 can also include contractions (e.g., the tokenized term "couldn't" in FIG. 2A). Additionally, it should be appreciated that the described embodiments can be configured to identify possessive forms of a tokenized term. For example, with reference to FIG. 2B, the described embodiments can construe "King's" as "King." Furthermore, it should be appreciated that the described embodiments can be configured to identify partial forms of a tokenized term. For example, with reference to FIG. 2B, described embodiments can associate an occurrence of the term "Humpty" within a document with the tokenized term "Humpty Dumpty."

It should also be appreciated that determinations made by the term encoding module 112 to assign a specific term ID to a particular tokenized term can be completely arbitrary or based on current term usage trends. For instance, the usage of a tokenized term can, over time, be increased. Accordingly, the computing device 102 can, according to some embodiments, periodically receive an updated set of tokenized terms that take into account newer usage trends of one or more tokenized terms. In this manner, the term rankings table 202 can be updated to reflect the newer usage trends of one or more tokenized terms.

It should be appreciated that the classifications of the terms included in the term ranking table 202 are merely exemplary and, thus, the described embodiments are not limited to the embodiments depicted in FIGS. 2A-2C. Indeed, the manner in which terms are classified and/or organized within the term rankings table 202 can occur in any fashion for purposes of obtaining greater search efficiency. For instance, according to some embodiments, one or more terms included in the term ranking table 202 can be associated with four-bit groups, eight-bit groups, ten-bit groups, and so on.

Also, according to some embodiments, other forms of data can be stored in a rankings table, similar to the term rankings table 202, for purposes of performing efficient searches consistent with the techniques described herein. For instance, in one scenario, one or more tags (or other forms of metadata) can be included in a rankings table and classified in a manner that enables the query processing module 118 to efficiently search a set of one or more documents to process a query in a manner similar to the examples provided in FIGS. 5A-7I.

Using the term rankings table 202, the metadata generation module 114 performs procedures on one or more documents made accessible to the computing device 102, which will now be described in greater detail in FIG. 2D. FIG. 2D illustrates an exemplary data structure that can be used to store information associated with documents for use in indexing/querying a set of documents, according to some embodiments. A documents table 208 is used by the computing device 102 to store various types of information associated with each document. For instance, as illustrated by the embodiment depicted in FIG. 2D, the documents table 208 can store a document identifier (e.g., document IDs 210, 212, 214, and so on) for each accessible document (e.g., "humpty.html," "jackandjill.pdf," and "sanfrancisco.key," respectively). According to some embodiments, the documents table 208 can be stored locally on the computing device 102 or on a remote computing device that is accessible to the computing device 102. Using the documents table 208, the metadata generation module 114 generates metadata that can be embedded in each document referenced in the documents table 208, which will now be described in greater detail in FIGS. 3A-3C.

Figure 3A:
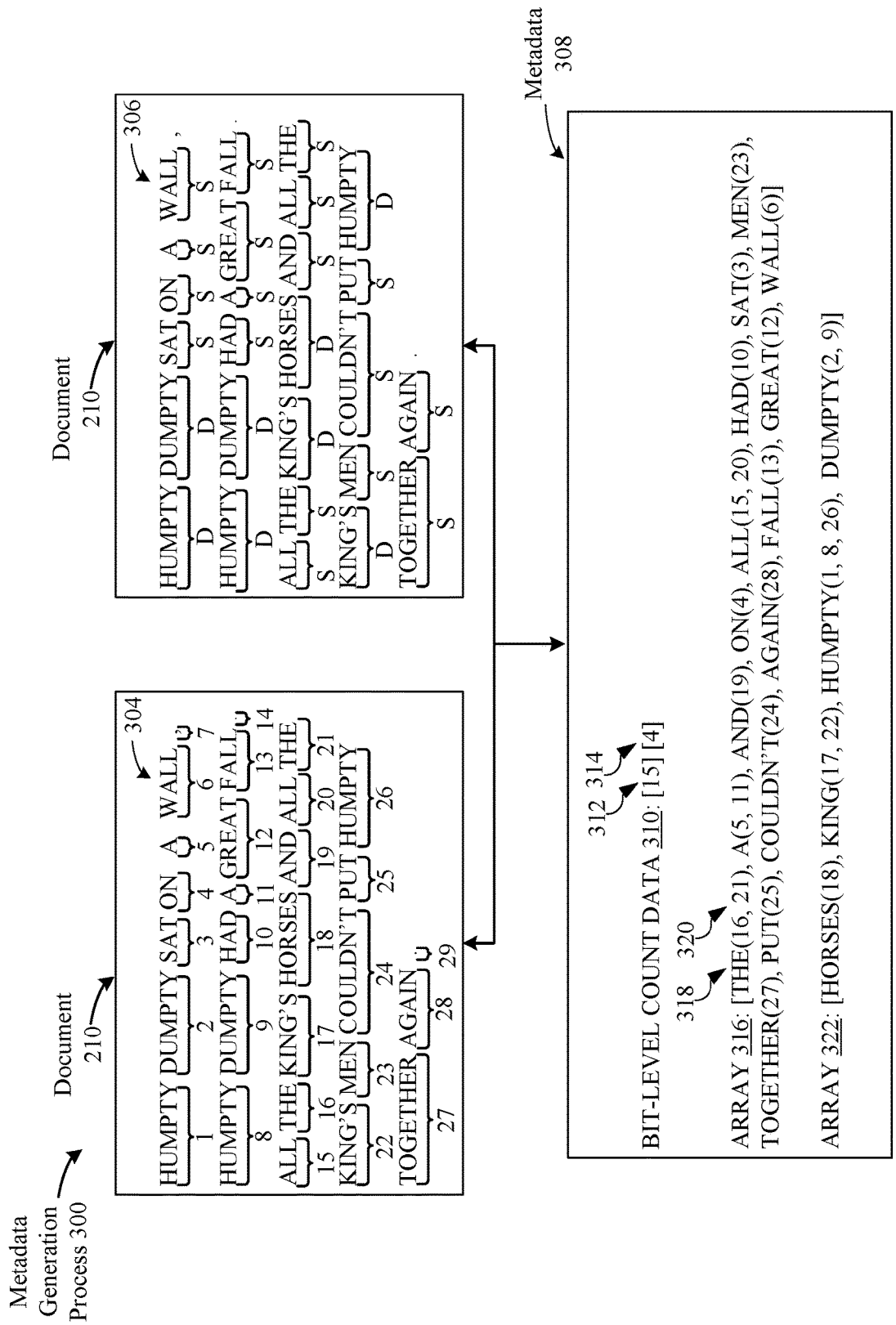
FIGS. 3A-3C illustrate metadata generation procedures that can be used during the performance of indexing/querying a set of documents, according to some embodiments.
Figure 3B:
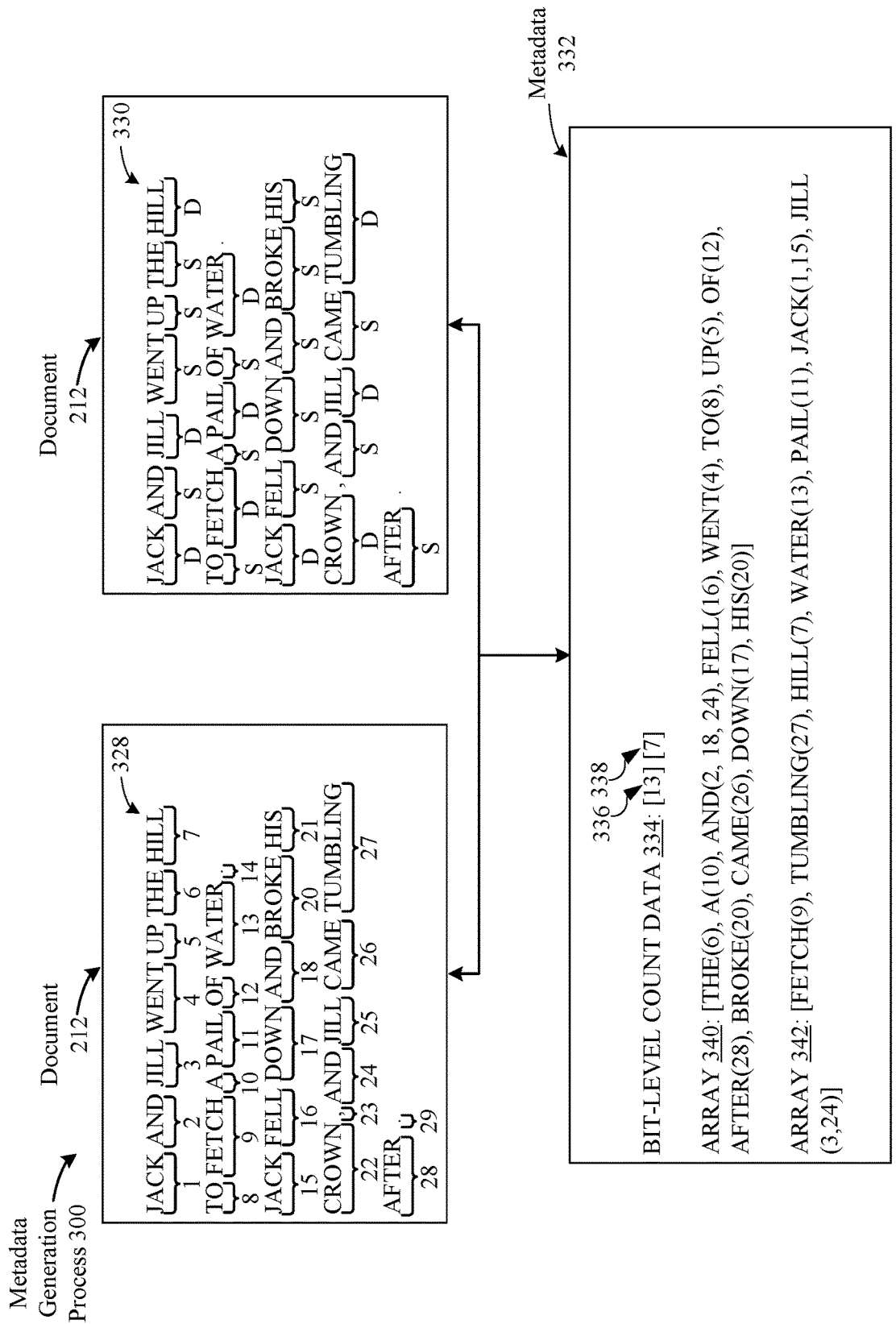
Figure 3C:
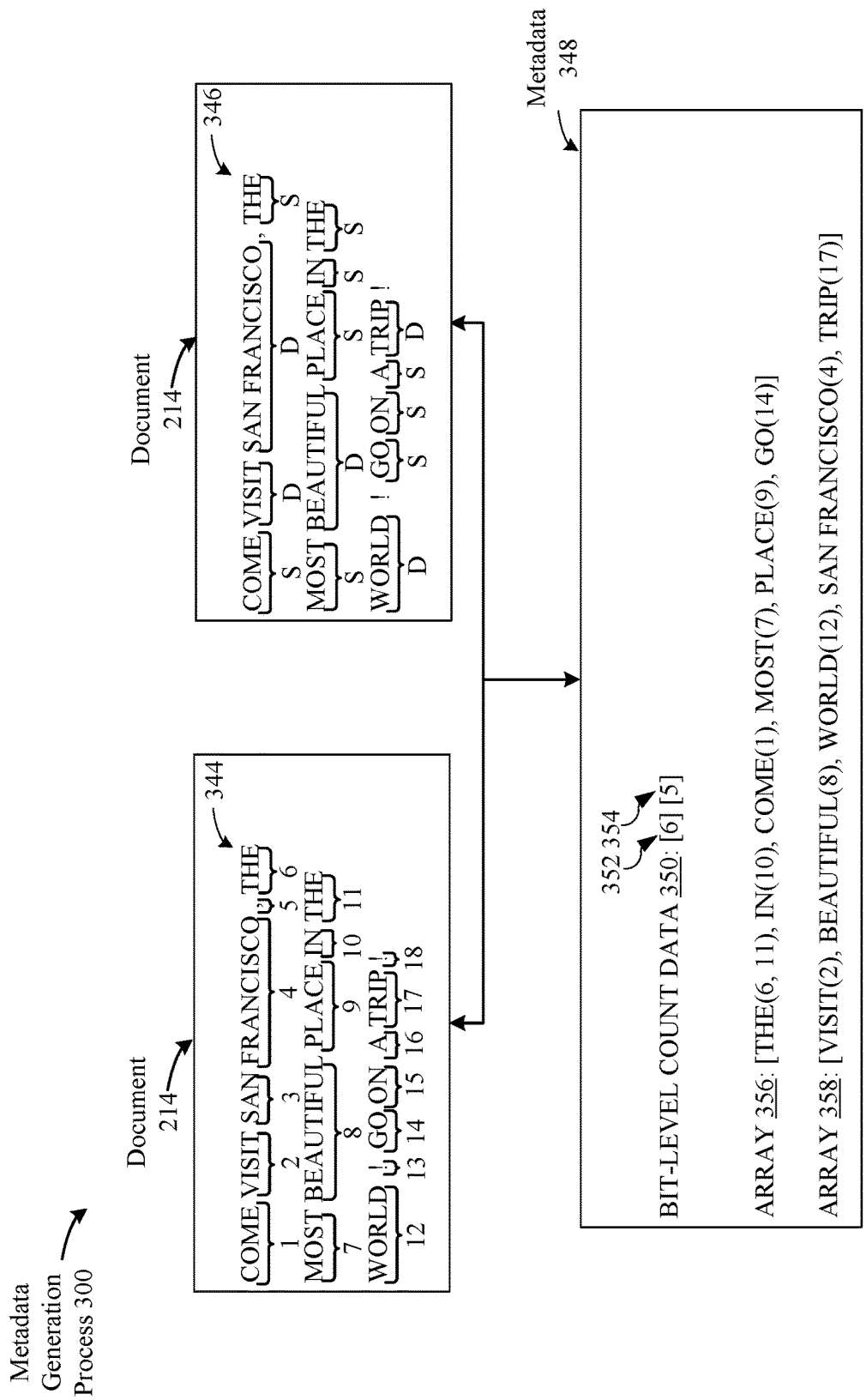

FIGS. 3A-3C illustrate metadata generation procedures that can be used during the performance of indexing/querying a set of documents, according to some embodiments. Specifically, FIGS. 3A-3C depict how the described embodiments can perform indexing procedures on different types of documents, such as common web-based document formats ((e.g., extensible markup language ("xml") files), hypertext markup language ("html") files, and so on)), electronic images of text/graphics ((e.g., portable document format ("pdf") files)), presentation documents, spreadsheets, and so on. For ease of reference, the specific documents described herein will be referenced by their respective document identifier (e.g., document 210 refers to "humpty.html"; document 212 refers to "jackandjill.pdf"; and document 214 refers to "sanfrancisco.key"). As depicted by a metadata generation process 300 in FIG. 3A, the metadata generation module 114 can identify positional information of a ranked tokenized term within a document 210. For example, with reference to a term position identification process 304, the document 210 can include positions 1-29 that are each capable of being occupied by a ranked tokenized term. As illustrated in the term position identification process 304, the metadata generation module 114 identifies that the ranked term "Humpty" and "Dumpty" occupies positions "1" and "2", respectively, within the document 210. In this fashion, the metadata generation module 114 can proceed to identify each individual position occupied by a word associated within a particular ranked tokenized term within a given document.

According to some embodiments, the metadata generation module 114 can be configured to identify positions within a particular document that are not occupied by a ranked tokenized term, such as an unranked term or punctuation mark. For instance, with further reference to the term position identification process 304, the metadata generation module 114 can recognize that a comma occupies position "7" and/or a period occupies position "14" within the document 210. In this manner, the metadata generation module 114 can accurately track the positions of ranked tokenized terms within a given document by accounting for/bypassing positions occupied by an unranked term or punctuation mark.

Additionally, as depicted by the metadata generation process 300 depicted in FIG. 3A, the metadata generation module 114 also identifies the manner in which a ranked tokenized term, within the document 210, is encoded. With reference to a bit-level identification process 306, the document 210 can include one or more ranked tokenized terms that are each encoded by the term encoding module 112. For example, the document 210 can include different terms that are encoded according to different bit-levels (e.g., a first bit-level, a second bit-level, and so on). As illustrated in the bit-level identification process 306, the metadata generation module 114 scans the document 210 and counts how many of each of the different bit-levels exist in the document. For instance, the metadata generation module 114 can determine that the document 210 includes fifteen (15) ranked tokenized terms that are encoded in accordance with a first bit-level and four (4) ranked tokenized terms that are encoded in accordance with a second bit-level. Although the document 210 includes ranked terms encoded with either a first or second bit-level, a document can include additional bit-levels not depicted in FIG. 3A.

Upon completion of the term position identification process 304 and the bit-level identification process 306, the metadata generation module 114 uses the data gathered from each process to produce a metadata 308 for the document 210. As illustrated in FIG. 3A, the metadata 308 includes a bit-level count data 310 for first bit-level encoded terms and second bit-level encoded terms. For instance, bit-level count 312 includes the number of ranked tokenized terms, within the document 210, that are encoded with a first bit-level (i.e., the fifteen ranked tokenized terms). Additionally, bit-level count 314 includes the number of ranked tokenized terms that are encoded with a second bit-level (i.e., the four ranked tokenized terms).

In addition to storing the number of ranked tokenized terms for each bit-level, the metadata 308 also includes two arrays that each store the ranked tokenized terms identified within the document 210. As illustrated in FIG. 3A, the arrays 316 and 322 are separate arrays that are each used to store one or more ranked tokenized terms of each bit-level. For example, the array 316 is used to store one or more ranked terms encoded with a first bit-level (e.g., ranked tokenized terms "the," "a,", "and," "on,", "all," "had," "sat", "men,", "together," "put," "couldn't," "again," "fall," "great," and "wall"). Also, the array 322 is used to store one or more ranked terms encoded with a second bit-level (e.g., ranked tokenized terms "horses," "king," "Humpty," and "Dumpty"). It should be noted that, although only two arrays are depicted in the metadata 308, additional arrays can be included to store one or more ranked terms associated with other encoded bit-levels.

Furthermore, as illustrated in FIG. 3A, the arrays 316 and 322 each also store positional information for each ranked tokenized term stored therein. For example, for a ranked tokenized term 318 (i.e., "the") stored in the array 316, a positional information 320 associated with the ranked tokenized term 318 can be included. The positional information 320 can include one or more positions within the document 210 in which an occurrence of the ranked term 318 is identified by the metadata generation module 114 (i.e., offset positions "16" and "21"). It should be appreciated that, according to some embodiments, the metadata 308 can be configured to include additional bit-level count data for embodiments configured to process ranked tokenized terms that are encoded in accordance with one or more bit-levels. In this fashion, the number of bit-level counts can be greater than the number of bit-level counts depicted in FIG. 3A.

FIGS. 3B and 3C illustrate how the metadata generation module 114 can perform procedures similar to those depicted in FIG. 3A for different types of documents. For example, with further reference to the metadata generation process 300, depicted now in FIG. 3B, the metadata generation module 114 performs a separate process to gather information associated with one or more ranked tokenized terms identified within a different document type, such as a "pdf" file depicted by the document 212, to generate a metadata 332. For instance, based on the data gathered by a bit-level identification process 330, the metadata generation module 114 determines that a bit-level count data 334 includes a first bit-level count 336 of thirteen (13) ranked tokenized terms that are encoded in accordance with a first bit-level and a second bit-level count 338 of seven (7) ranked tokenized terms that are encoded in accordance with a second bit-level.

Also, as illustrated in FIG. 3B, the metadata generation module 114 stores an array 340 that includes each first bit-level term identified within the document 212, along with their respective positions as determined by a term position identification process 328. Additionally, the metadata generation module 114 can store an array 342 that includes each second bit-level term identified within the document 212, along with their respective positions as determined by the term position identification process 328. Accordingly, the metadata 332, storing the described data in FIG. 3B, is embedded into the document 212 and used for indexing/query procedures, which will be described in greater detail herein.

With reference now to the metadata generation process 300 depicted in FIG. 3C, the metadata generation module 114 performs an additional process to gather information associated with one or more ranked tokenized terms identified within the document 214, a presentation document (e.g., ".key" file), to generate a metadata 348. For instance, based on the data gathered by a bit-level identification process 346, the metadata generation module 114 can determine that a bit-level count data 350 includes a first bit-level count 352 of six (6) ranked tokenized terms that are encoded in accordance with a first bit-level and a second bit-level count 354 of five (5) ranked tokenized terms that are encoded in accordance with a second bit-level.

Also, as illustrated in FIG. 3C, the metadata generation module 114 stores an array 356 that includes each first bit-level term identified within the document 214, along with their respective positions as determined by a term position identification process 344. Additionally, the metadata generation module 114 stores an array 358 that includes each second bit-level term identified within the document 214, along with their respective positions as determined by the term position identification process 344. Accordingly, the metadata 348, storing the described data in FIG. 3C, is embedded into the document 214 and used for indexing/ query procedures, which will be described in greater detail herein in FIG. 4, which will now be discussed.

It should be noted that, although the embodiments depicted in FIGS. 3A-3C appear to use only two different bit-levels/two different corresponding arrays, embodiments of the present invention are not limited to such. For example, the metadata, described herein, can include bit-level counts that can include one or more ranked terms encoded with additional bit-levels that can be associated with a corresponding array that stores one or more ranked tokenized terms.

FIG. 4 illustrates exemplary indexing procedures 400 to generate indexes for one or more documents, according to some embodiments. For instance, FIG. 4 illustrates an exemplary data structure for storing indexes produced by the indexing module 116, according to some embodiments. As illustrated in FIG. 4, an indexed document table 402 stores various types of information associated with the indexing procedures (e.g., forward indexing procedures) performed by the indexing module 116 on documents that are made accessible to the computing device 102 (e.g., the documents 210, 212, and 214). For instance, the indexing module 116 stores the information included in metadata created, by the metadata generation module 114, for each document during the metadata generation process 300 depicted in FIGS. 3A-3C.

For instance, as illustrated in FIG. 4, the indexing module 116 generates, within the index document table 402, one or more indexes that are each used to store data associated with one or more documents processed by the metadata generation module 114. The indexing module 116 inserts each document ID (e.g., document IDs 210, 212, and 214) for each accessible document (e.g., "humpty.html," "jackandjill.pdf," and "sanfrancisco.key") along with the corresponding metadata of each document (e.g., the metadata 308, 332, and 348) into the indexed document table 402. In this fashion, the index document table 402 stores, for each document, (1) array data, (2) bit-level count data, and (3) the positional information of each ranked tokenized terms that can be relevant to a search query. In addition, the indexing module 116 creates an index identifier (e.g., index IDs 404, 406, and 408) which can be referenced by the query processing module 118 when processing a search query, which will now be described in greater detail in FIGS. 5A-5H.

FIGS. 5A-5H illustrate a set of procedures for processing a search query using a set of indexed documents, according to some embodiments. Specifically, FIGS. 5A-5H illustrate how a search query that includes a combination of different bit-level terms can be processed, according to some embodiments. By performing the procedures described in FIGS. 5A-5H, the described embodiments can quickly introspect one or more documents that include a combination frequently used terms and infrequently used terms for processing a search query within a reasonable period of time compared to conventional solutions. As described herein, the data stored in the indexed document table 402 can be used by the query processing module 118 to quickly retrieve any relevant search terms by simply analyzing the information included in each index. For instance, with reference to FIG. 5A, the computing device 102 can receive a search query 500, inputted from a user, that includes the search terms "beautiful place in the world," in which the user seeks to locate a desirable travel destination. According to some embodiments, the search terms can be received by the computing device 102 via a text input field displayed to the user through a browser.

Upon receipt of the search query 500, the query processing module 118 processes the first search term "beautiful" by referencing the term rankings table 202 to determine whether "beautiful" is a recognizable ranked tokenized term. As previously depicted in FIG. 2B, "beautiful" is a ranked tokenized term that is encoded in accordance with a second bit-level. Accordingly, by referencing the term rankings table 202, the query processing module 118 determines that "beautiful" is encoded in accordance with a second bit-level. Given that the first search term is determined to be encoded in accordance with a second bit-level, the query processing module 118 can quickly reference the index id that includes the second bit-level search term.

Figure 5A:
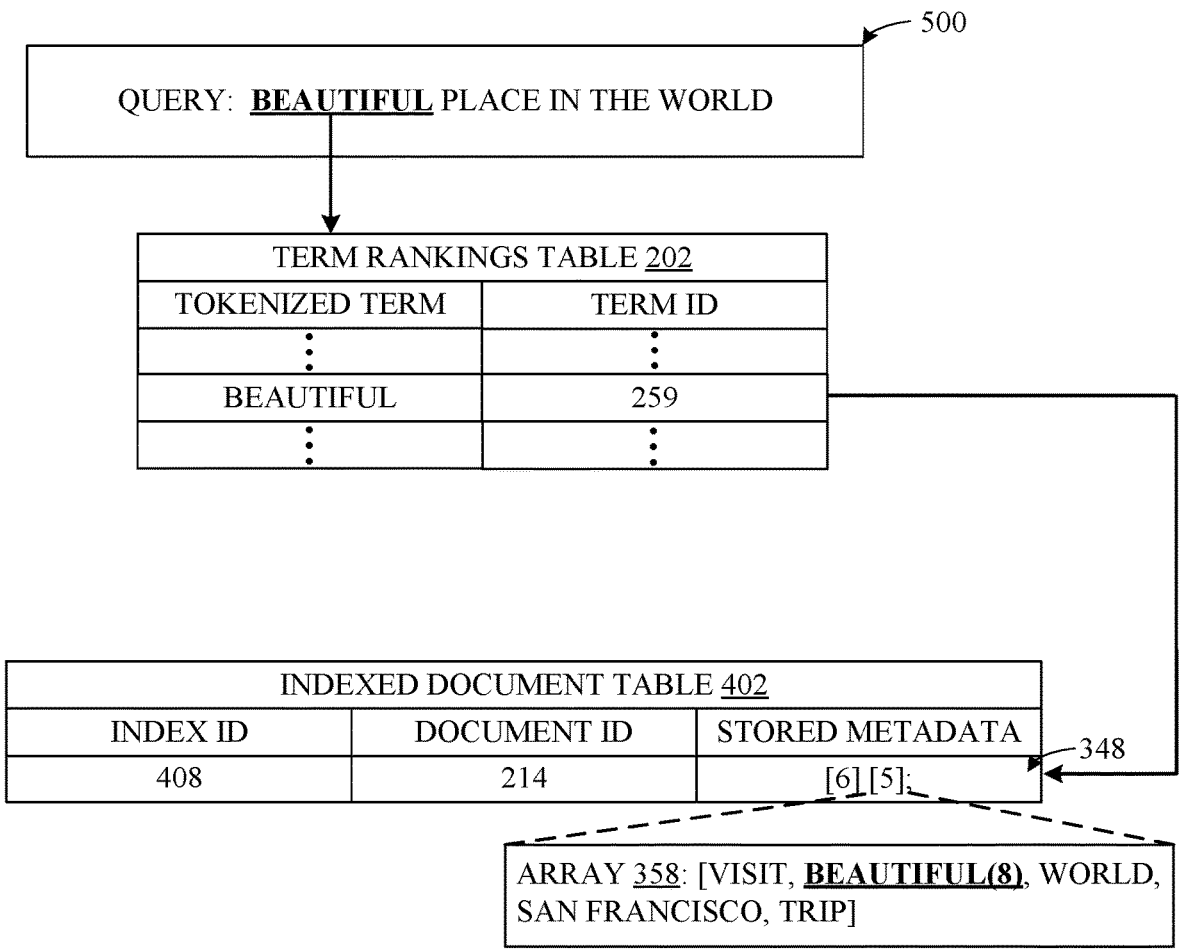
FIGS. 5A-5H illustrate a set of procedures for processing a search query using a set of indexed documents, according to some embodiments.

For instance, with further reference to FIG. 5A, the query processing module 118 accesses the indexed document table 402 to reference indexed data associated with at least one document made accessible to the computing device 102. As depicted in FIG. 5A, the query processing module 118 can directly access a document that includes the term "beautiful," such as the document 214 via the index ID 408. Accordingly, the query processing module 118 performs a search on the array storing the ranked terms associated with the second bit-level for the document 214, the array 358, to gather positional information associated with "beautiful." During traversal of the array 358, the query processing module 118 gathers the positional information of "beautiful," within the document 214, as stored by the array 358.

For example, as depicted in FIG. 5A, the query processing module 118 reads positional data, stored by the array 358, that indicates "beautiful" is located within the document 214 at the eighth (8) position. Upon gathering the positional information, the query processing module 118 then proceeds to perform additional procedures, using the metadata 348, for next search term of the search query 500, "place." In this fashion, the query processing module 118 attempts to provide a thorough introspection of the document 214 to quickly and efficiently determine how many search terms are potentially present in document 214 before proceeding to search a different document.

Figure 5B:
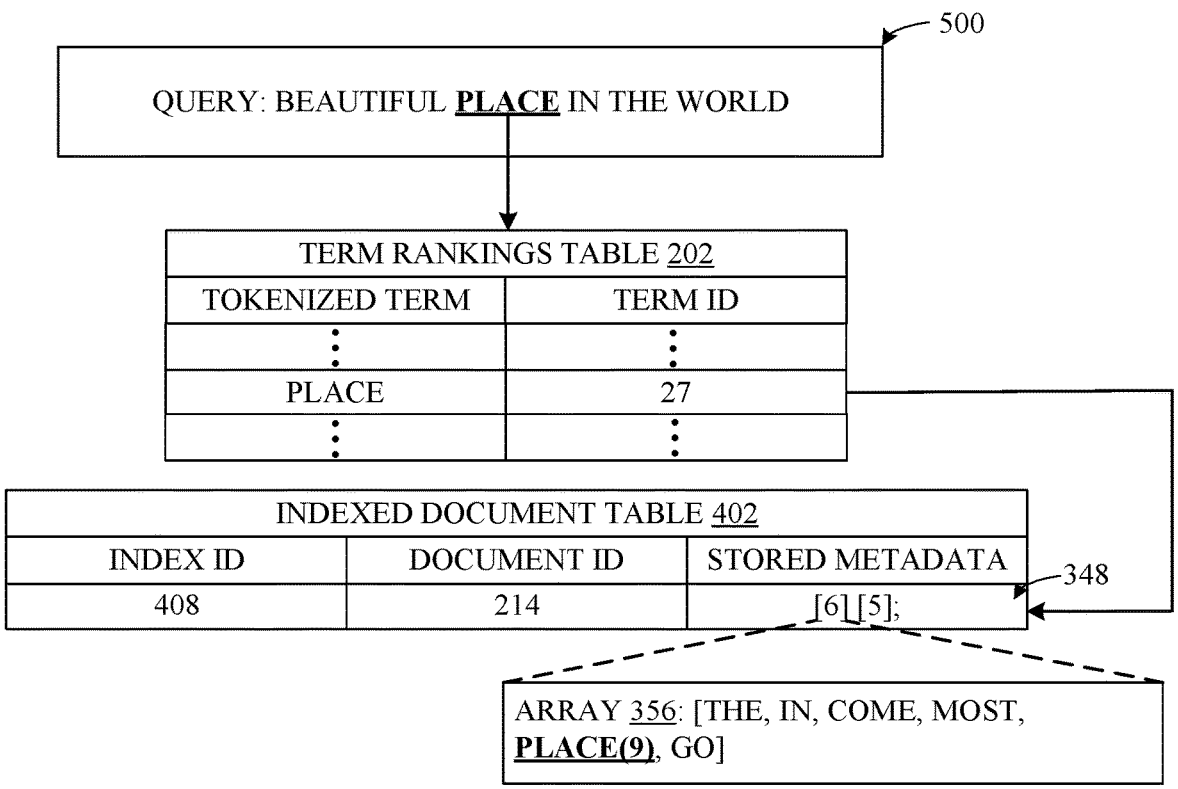

With reference to FIG. 5B, the query processing module 118 initially processes the search term "place" by referencing the term rankings table 202 to determine the bit-level associated with "place." As previously depicted in FIG. 2A, "place" is encoded in accordance with a first bit-level. Accordingly, by referencing the term rankings table 202, the query processing module 118 determines that "place" is encoded in accordance with a first bit-level. With further reference to FIG. 5B, the query processing module 118 accesses the indexed document table 402 to reference, via the index ID 408, the bit-level count value stored in the metadata 348 for the document 214 to determine whether the document 214 potentially includes "place." Thus, using a similar rationale expressed in FIG. 5A, the query processing module 118, in FIG. 5B, bypasses searching the array 358 which stores ranked tokenized terms encoded with a second bit-level, in an attempt to quickly and efficiently locate the search term "place."

As illustrated in FIG. 5B, the query processing module 118 recognizes that the document 214 includes six (6) ranked tokenized terms that are encoded in accordance with a first bit-level. Accordingly, the query processing module 118 performs a search on the array storing the ranked terms associated with the first bit-level, the array 356, to determine whether the array stores "place." During traversal of the array 356, the query processing module 118 determines that the array 356 stores "place." In response to this determination, the query processing module 118 then proceeds, via the index ID 408, to gather the positional information of "place" within the document 214, as stored by the array 356. For example, as depicted in FIG. 5B, the query processing module 118 reads positional data, stored by the array 356, that indicates "place" is located within the document 214 at the ninth (9) position. Upon gathering the positional information, the query processing module 118 then proceeds to perform additional procedures, using the metadata 348, for next search term of the search query 500, "in," as illustrated in FIG. 5C.

As previously depicted in FIG. 2A, the term "in" is encoded in accordance with a first bit-level. Accordingly, by referencing the term rankings table 202, the query processing module 118 determines that "in" is encoded in accordance with a first bit-level. With reference (again) to FIG. 5C, the query processing module 118 accesses the indexed document table 402 to reference, via the index ID 408, the first bit-level count value stored in the metadata 348, for the document 214, to determine whether the document 210 potentially includes "in." As previously described, the query processing module 118 recognizes that the document 214 includes six (6) ranked terms that are encoded in accordance with a first bit-level and performs a search on the array 356 to determine whether the array 356 also stores "in."

Figure 5C:
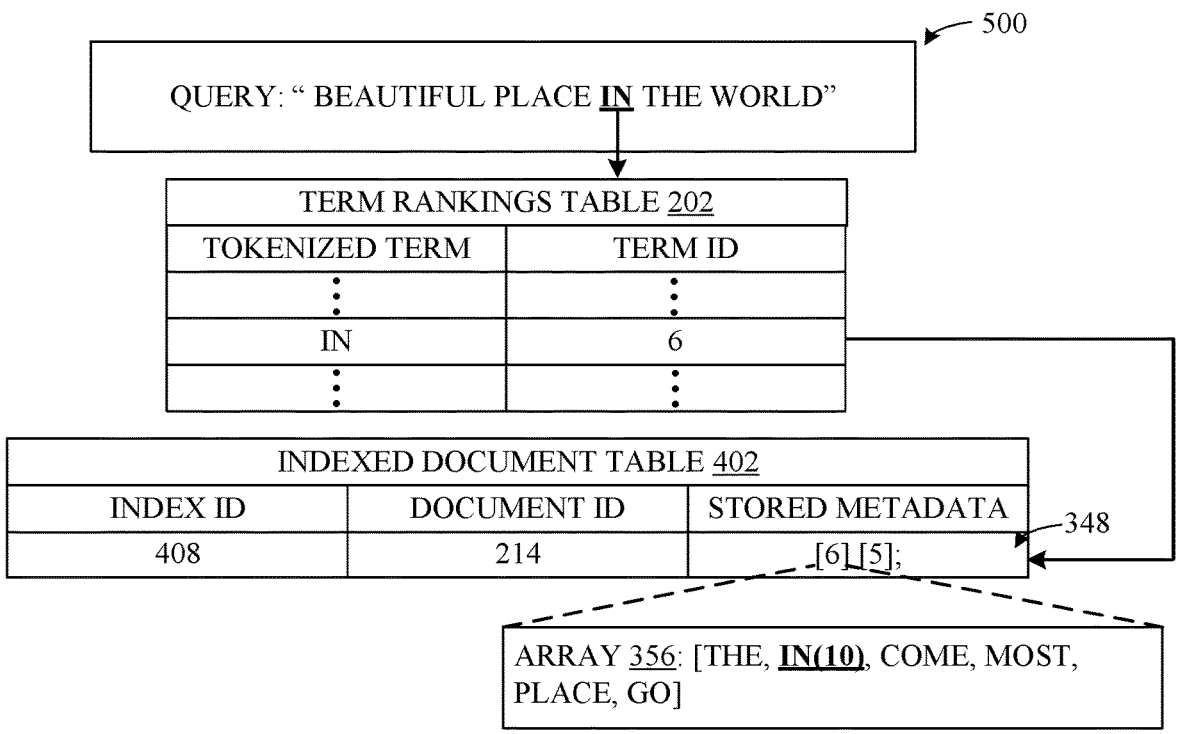

As depicted in FIG. 5C, during traversal of the array 356, the query processing module 118 determines that the array 356, in fact, stores "in." In response to this determination, the query processing module 118 then proceeds, via the index ID 408, to gather the positional information of "in" within the document 214, as stored by the array 356. For example, as depicted in FIG. 5C, the query processing module 118 reads positional data, stored by the array 356, that indicates "in" is located within the document 214 at the tenth (10) position. Upon gathering the positional information, the query processing module 118 then proceeds to perform additional procedures, using the metadata 348, for next search term of the search query 500, "the," as illustrated in FIG. 5D.

As previously depicted in FIG. 2A, the term "the" is also encoded in accordance with a first bit-level. Accordingly, by referencing the term rankings table 202, the query processing module 118 determines that "the" is encoded in accordance with a first bit-level. With reference (again) to FIG. 5D, the query processing module 118 accesses the indexed document table 402 to reference, via the index ID 408, the first bit-level count value stored in the metadata 348, for the document 214, to determine whether the document 214 potentially includes "the." As previously described, the query processing module 118 recognizes that the document 214 includes six (6) ranked tokenized terms that are encoded in accordance with a first bit-level and performs a search on the array 356 to determine whether the array 358 also stores "the."

Figure 5D:
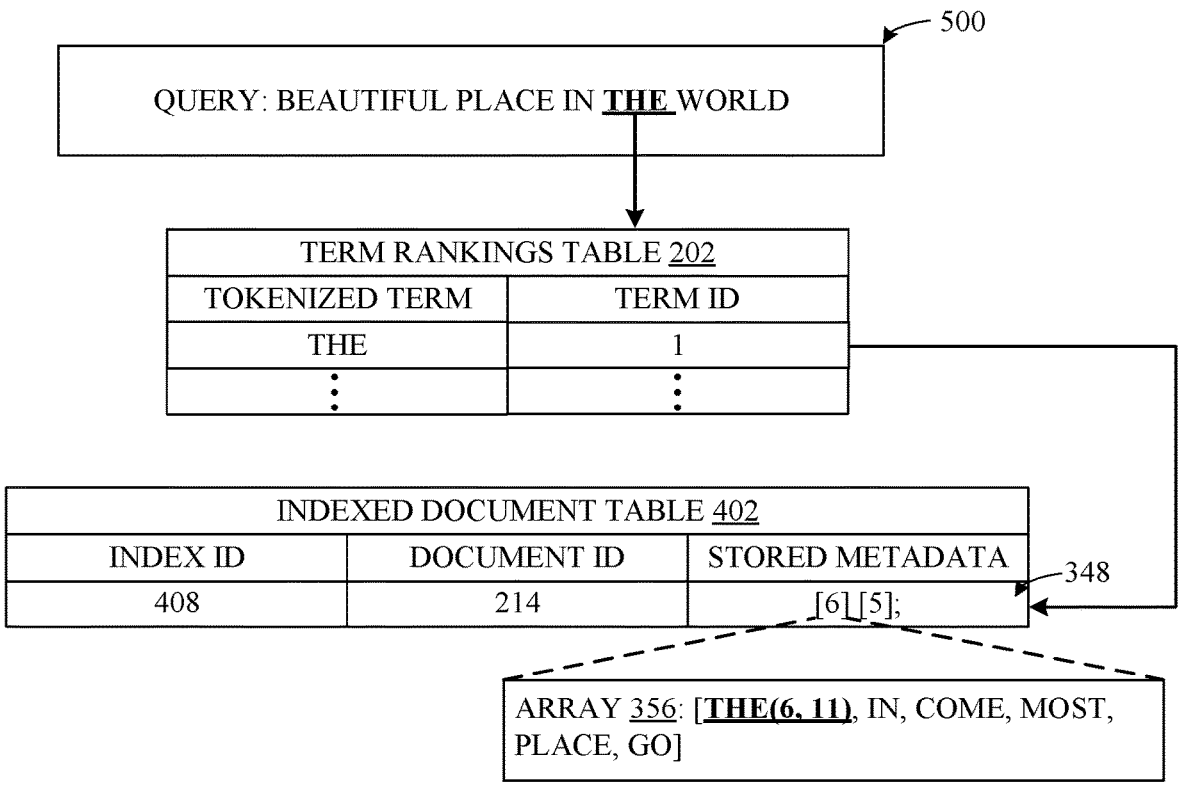
Figure 5E:
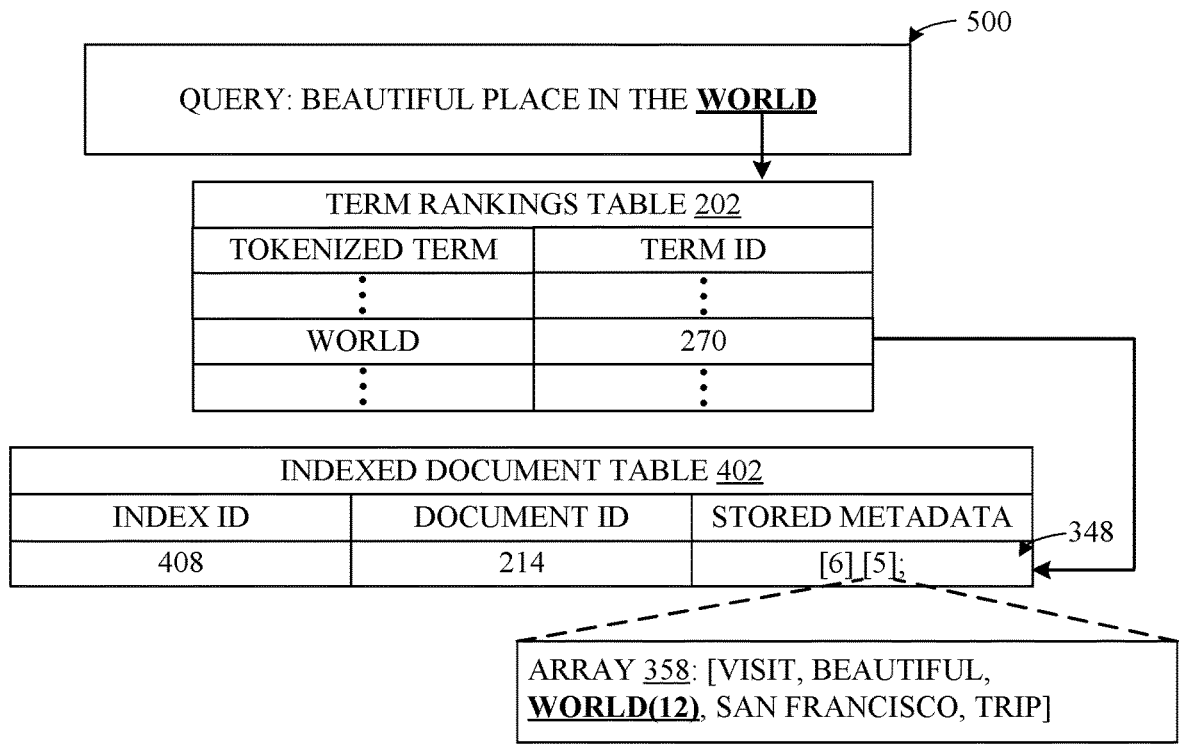

As depicted in FIG. 5D, during traversal of the array 356, the query processing module 118 determines that the array 356, in fact, stores "the." In response to this determination, the query processing module 118 then proceeds, via the index ID 408, to gather the positional information of "the" within the document 214, as stored by the array 356. For example, as depicted in FIG. 5D, the query processing module 118 reads positional data, stored by the array 356, that indicates "the" is located within the document 214 at the sixth (6) and eleventh (11) positions. Upon gathering the positional information, the query processing module 118 then proceeds to perform additional procedures, using the metadata 348, for the final search term of the search query 500, "world," as illustrated in FIG. 5E.

As previously depicted in FIG. 2B, the term "world" is encoded in accordance with a second bit-level. Accordingly, by referencing the term rankings table 202, the query processing module 118 determines that "world" is encoded in accordance with a second bit-level. With reference (again) to FIG. 5E, the query processing module 118 accesses the indexed document table 402 to reference, via the index ID 408, the second bit-level count value stored in the metadata 348, associated with the document 214, to determine whether the document 214 potentially includes "world."

As previously described, the query processing module 118 recognizes that the document 214 includes five (5) ranked tokenized terms that are encoded in accordance with a second bit-level and performs a search on the array 358 to determine whether the array 358 stores "world." In this fashion, the query processing module 118 attempts to provide a through introspection of the document 214 to quickly and efficiently determine how many second bit-level terms are also potentially present in document 214 before proceeding to search a different document. As depicted in FIG. 5E, during traversal of the array 358, the query processing module 118 determines that the array 358, in fact, stores "world."

In response to this determination, the query processing module 118 then proceeds to, via the index ID 408, gather the positional information of "world" within the document 214, as stored by the array 358. For example, as depicted in FIG. 5E, the query processing module 118 reads positional data, stored by the array 358, that indicates "world" is located within the document 214 at the twelfth (12) position. According to some embodiments, the query processing module 118 can proceed to perform additional procedures, using the indexed document table 402, to locate additional documents that include one or more search terms associated with the search query 500. For instance, the query processing module 118 can perform procedures similar to those depicted in FIGS. 5A-5E for the search term "place" included in the search query 500, as will now be described in FIG. 5F.

Figure 5F:
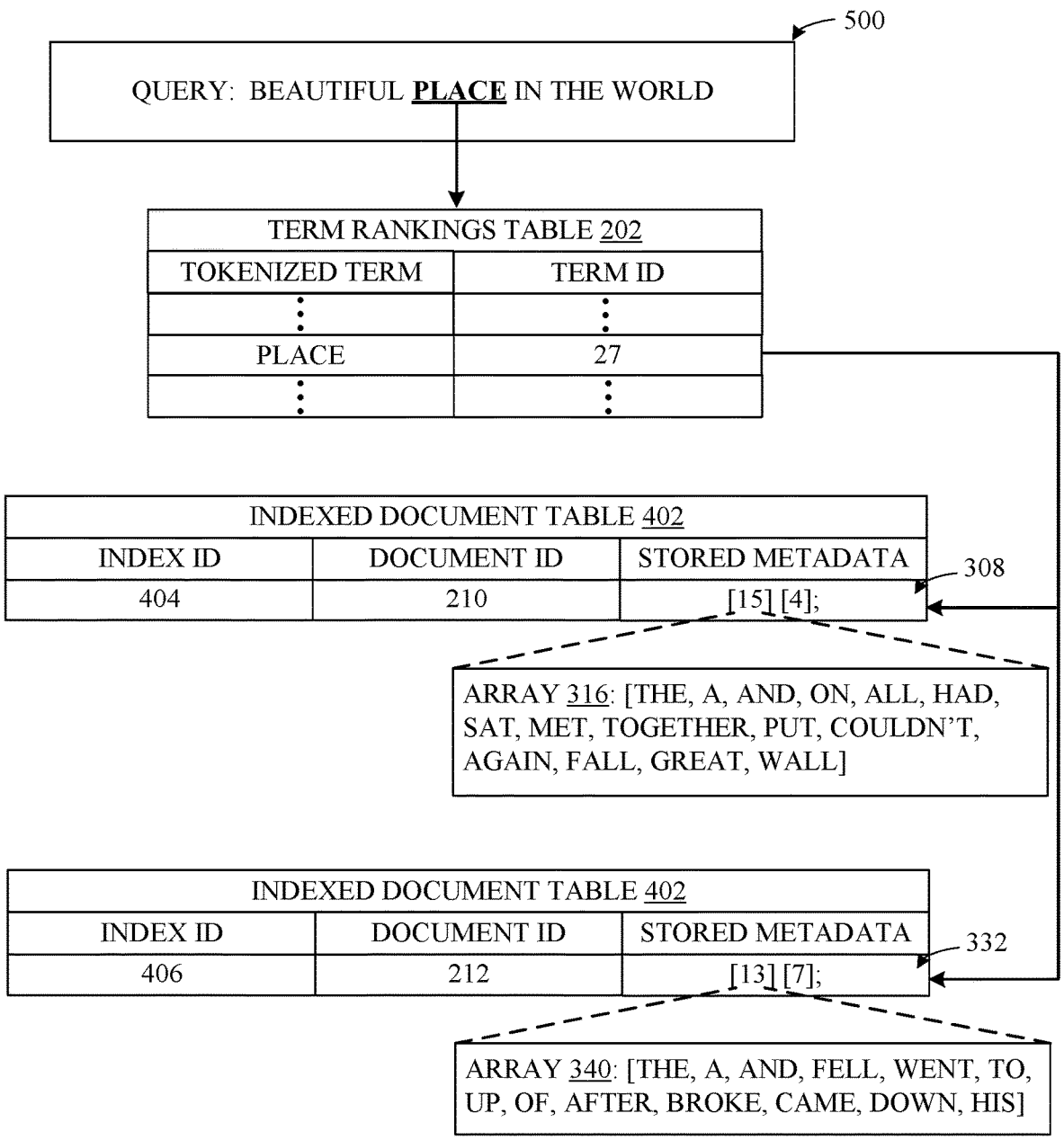

As illustrated in FIG. 5F, the query processing module 118 accesses the indexed document table 402 to reference, via the index IDs 404 and 406, indexed data associated with additional documents, such as the documents 210 and 212, respectively, to determine whether either document potentially includes the term "place." As previously described herein, the query processing module 118, using the term rankings table 202, determines that "place" is encoded in accordance with a first bit-level. Accordingly, the query processing module 118 accesses the indexed document table 402 to reference, via the index ID 404, the first bit-level count value stored in the metadata 308 for the document 210 in order to determine whether the document 210 potentially includes "place." As previously described, the query processing module 118 recognizes that the document 210 includes fifteen (15) ranked tokenized terms that are encoded in accordance with a first bit-level and performs a search on the array 316 to determine whether the array 316 stores "place."

As depicted in FIG. 5F, upon complete traversal of the array 316, the query processing module 118 determines that the array 316 does not store "place." In response to this determination, the query processing module 118 then proceeds to reference, via the index ID 406, the first bit-level count value stored in the metadata 332 for the document 212. As further illustrated in FIG. 5F, the query processing module 118 recognizes that the document 212 includes thirteen (13) ranked tokenized terms that are encoded in accordance with a first bit-level. Accordingly, the query processing module 118 performs a search on the array 340, which stores the ranked tokenized terms associated with the first bit-level to determine whether the array 340 stores "place." Upon complete traversal of the array 340, the query processing module 118 determine that the array 340 also does not store "place." In response to this determination, the query processing module 118 can perform procedures similar to those depicted in FIG. 5F for the search term "in" included in the search query 500, which yields results similar to those described with respect to the search term "place."

Figure 5G:
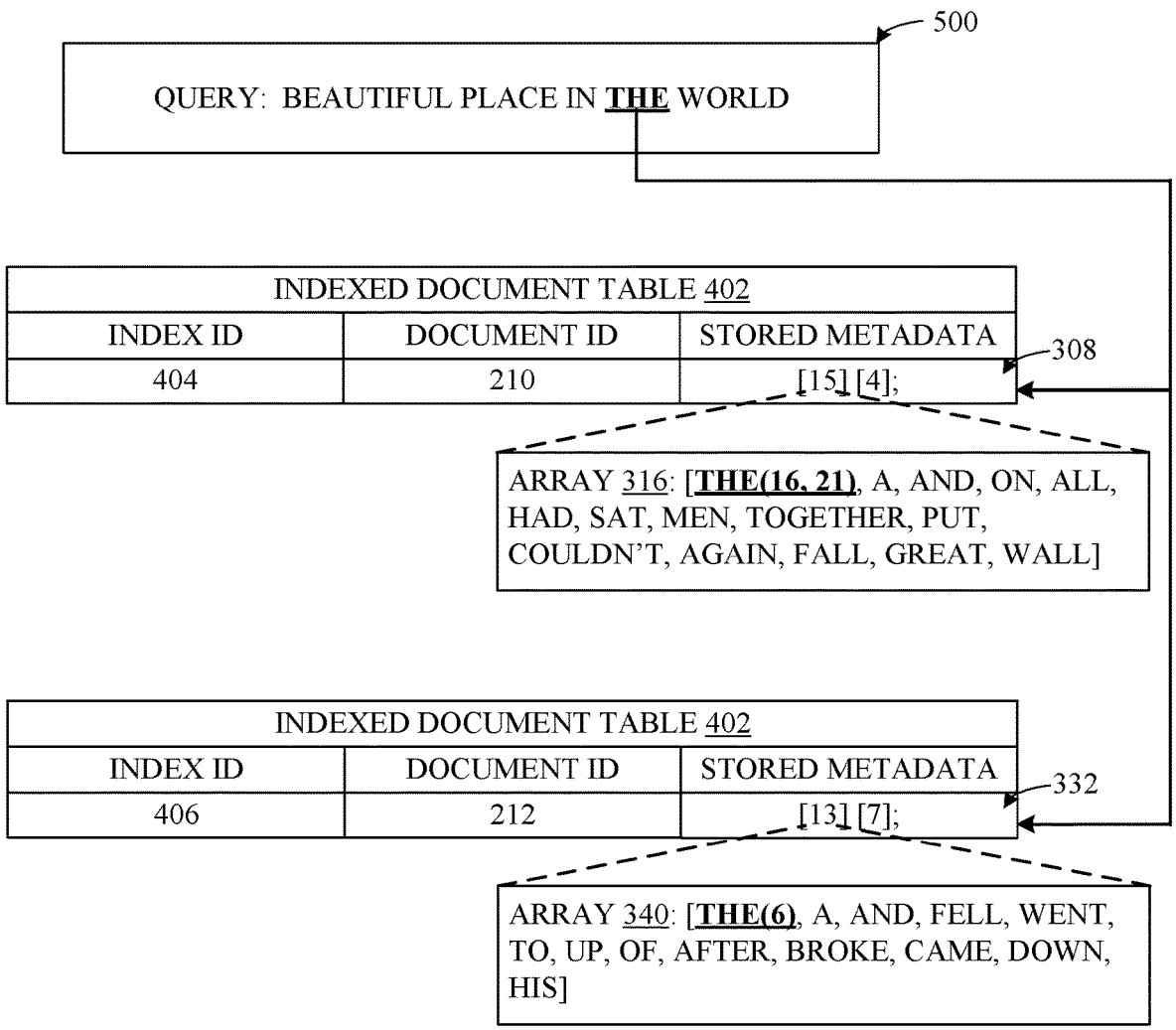

Turning now to FIG. 5G, the query processing module 118 can access the indexed document table 402 to reference, via the index IDs 404 and 406, indexed data associated with additional documents, such as the documents 210 and 212, respectively, to determine whether either document potentially includes the term "the." As previously described herein, the query processing module 118, using the term rankings table 202, determines that "the" is encoded in accordance with a first bit-level. Accordingly, the query processing module 118 accesses the indexed document table 402 to reference, via the index ID 404, the first bit-level count value stored in the metadata 308 for the document 210 to determine whether the document 210 potentially includes "the."

As previously described, the query processing module 118 recognizes that the document 210 includes fifteen (15) ranked tokenized terms that are encoded in accordance with a first bit-level and performs a search on the array 316 to determine whether the array 316 stores "the." During traversal of the array 316, the query processing module 118 determines that the array 316, in fact, stores "the." In response to this determination, the query processing module 118 then proceeds to gather, via the index ID 404, the positional information of "the" within the document 210, as stored by the array 316. For example, as depicted in FIG. 5G, the query processing module 118 reads positional data, stored by the array 316, that indicates "the" is located within the document 210 at the sixteenth (16) and twenty-first (21) positions.

According to some embodiments, the query processing module 118 can proceed to perform additional procedures, using the metadata 308, to determine whether the document 210 also includes one or more search terms included in the search query 500. For instance, using procedures similar to those described in FIGS. 5A-5F, the query processing module 118 can determine whether the document 210 also includes the search terms "beautiful," "in" and/or "world." Upon completion of these procedures, the query processing module 118 can determine that the document 210 does not include the search terms "beautiful," "in" and/or "world."

Accordingly, with further reference to FIG. 5G, the query processing module 118 can then access the indexed document table 402 to reference, via index ID 406, indexed data associated with the document 212 to determine whether document 212 includes "the." The query processing module 118 recognizes that the document 212 includes thirteen (13) ranked tokenized terms that are encoded in accordance with a first bit-level. Accordingly, the query processing module 118 performs a search on the array 340, to determine whether the array stores "the." During traversal of the array 340, the query processing module 118 determines the array 340 also stores "the." In response to this determination, the query processing module 118 then proceeds, via the index ID 406, to gather the positional information of "the" within the document 212, as stored by the array 340. For example, as depicted in FIG. 5G, the query processing module 118 reads positional data, stored by the array 340, that indicates "the" is located within the document 212 at the sixth (6) position. Upon gathering the positional information from the index IDs, as detailed in FIGS. 5A-5G, the query processing module 118 can then proceed to store the search results performed for search query 500 for eventual display to the user, as will now be described in greater detail in FIG. 5H.

Figure 5H:

As illustrated in FIG. 5H, the query results table 502 includes each document and a corresponding set of relevant search terms that were identified by the query processing module 118 while processing the search query 500. For instance, the query results table 502 includes each search term identified within the documents 210, 212, and 214 along with their respective positions within their respective documents. Furthermore, as depicted in FIG. 5H, the results stored within the query results table 502 can be displayed via a display device 504. According to some embodiments, the query results table 502 stores data for generating a hyperlink (e.g., hyperlink 506) for each of the documents 210, 212, and 214 which can be displayed, via the display device 504, within a short period of time of the computing device 102 receiving the search query 500. For instance, in response to a detected selection of the hyperlink 506, the document 214 can be displayed, via the display device 504. As depicted in FIG. 5H, according to some embodiments, a preview (e.g., preview 508) of each document can be displayed with each search term, from the search query 500, highlighted using the positional information stored by the query results table 502.

According to some embodiments, the ordering in which each document is displayed within the display device 504 can be pre-determined. For example, according to some embodiments, a hyperlink to a document can be prioritized over other documents based on the document containing the most number of relevant search terms identified by the query processing module 118. According to some embodiments, a hyperlink to a document can be prioritized over other documents based on the document containing the most number of second bit-level terms relative to the other documents. In this fashion, embodiments of the present invention can be configured in a number of different ways to display highly relevant documents based on a specified set of search terms.

FIGS. 6A-6F illustrate another set procedures for processing a search query using a set of indexed documents, according to some embodiments. Specifically, FIGS. 6A-6F illustrate how a search query that includes only first bit-level terms can be processed, according to some embodiments. By performing the procedures described in FIGS. 6A-6F, the described embodiments can quickly introspect one or more documents that include frequently used terms for processing a search query within a reasonable period of time compared to conventional solutions. For instance, with reference now to FIG. 6A, the computing device 102 can receive a search query 600, inputted from a user, that includes the search terms "sat on a wall," in which the user seeks to possibly identify the nursery rhyme that includes the phrase "sat on a wall." Thus, each search term of the search query 600 includes terms that are generally present in most documents which, for conventional solutions, potentially bottleneck search query processing and can result in a delay in displaying relevant search results.

Figure 6A:
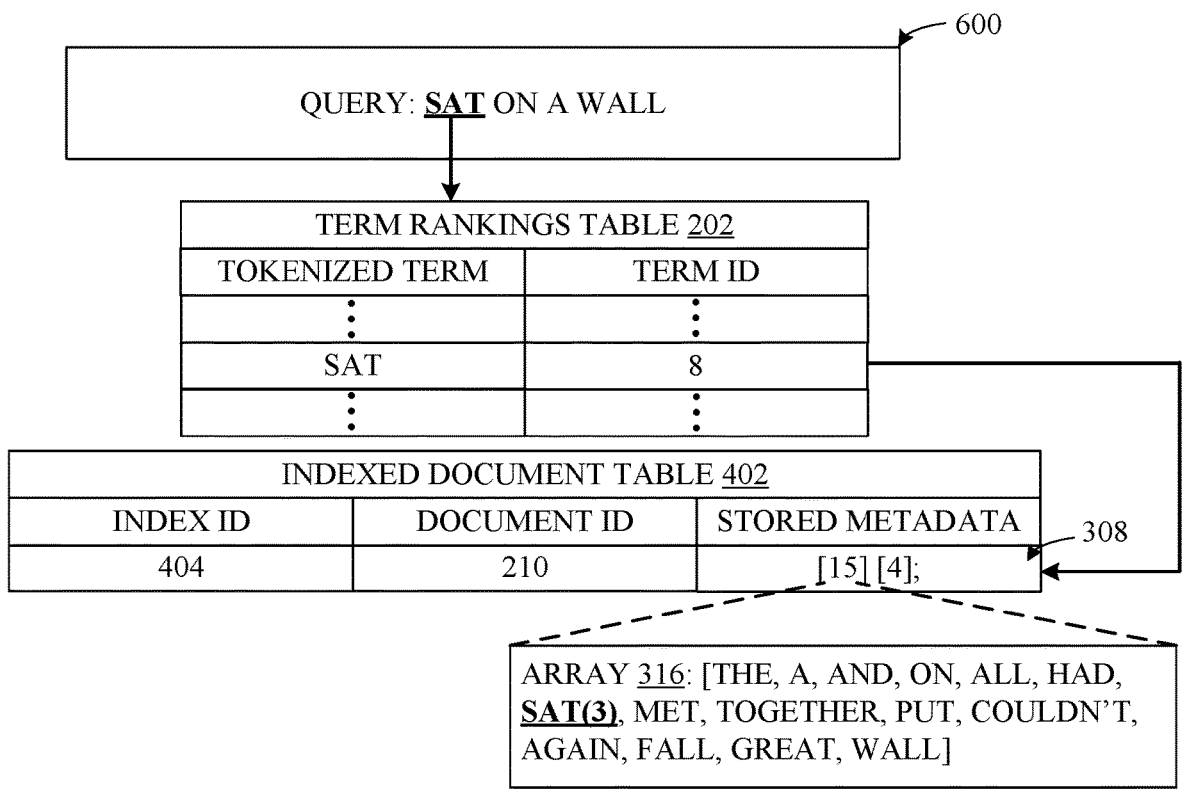
FIGS. 6A-6F illustrate another set procedures for processing a search query using a set of indexed documents, according to some embodiments.

Upon receipt of the search query 600, the query processing module 118 can initially process the first search term "sat" by referencing the term rankings table 202 to determine whether "sat" is a recognizable ranked term. As previously depicted in FIG. 2A, "sat" is one of several ranked terms that are encoded in accordance with a first bit-level. By referencing the term rankings table 202, the query processing module 118 determines that "sat" is encoded in accordance with a first bit-level. With further reference to FIG. 6A, the query processing module 118 accesses the indexed document table 402 and references, via the index ID 404, the first bit-level count value stored in the metadata 308 for the document 210 to determine whether the document 210 potentially includes "sat." As illustrated in FIG. 6A, the query processing module 118 recognizes, based on the metadata 308, that the document 210 includes fifteen (15) ranked tokenized terms that are encoded in accordance with a first bit-level.

Accordingly, the query processing module 118 performs a search on the array storing the ranked tokenized terms associated with the first bit-level, the array 316, to determine whether the array 316 stores "sat." During traversal of the array 316, the query processing module 118 determines that the array 316 does, in fact, store "sat." In response to this determination, the query processing module 118 then proceeds to gather, via the index ID 404, the positional information of "sat" within the document 210, as stored by the array 316. For example, as depicted in FIG. 6A, the query processing module 118 reads positional data, stored by the array 316, that indicates "sat" is located within the document 210 at the third (3) position. Upon gathering the positional information, the query processing module 118 then proceeds to perform additional procedures, using the metadata 308, for the next search term of the search query 600, "on," as illustrated in FIG. 6B.

Figure 6B:
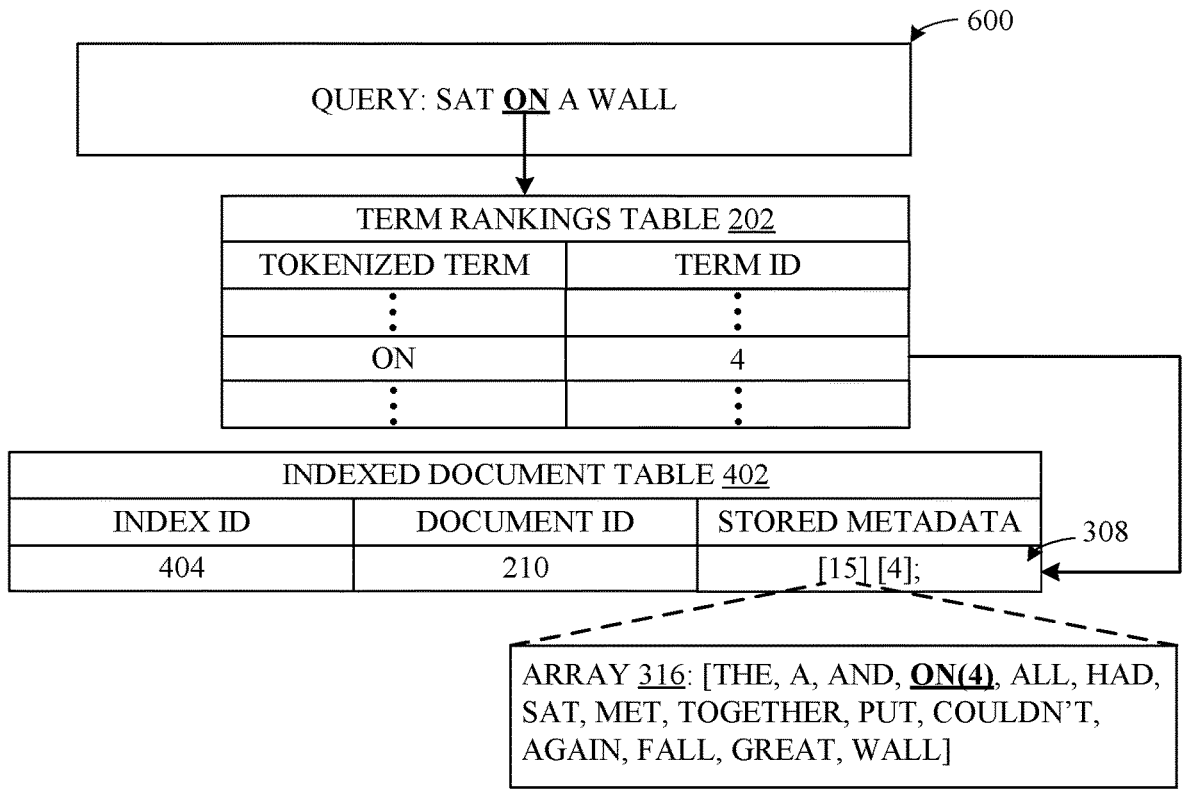

As depicted in FIG. 6B, the query processing module 118 processes the search term "on" by referencing the term rankings table 202 to determine whether "on" is a recognizable ranked tokenized term. As previously depicted in FIG. 2A, "sat" is encoded in accordance with a first bit-level. By referencing the term rankings table 202, the query processing module 118 determines that "sat" is encoded in accordance with a first bit-level. Accordingly, with reference (again) to FIG. 6B, the query processing module 118 performs a search on the array 316 to determine whether the array 316 stores "on." During traversal of the array 316, the query processing module 118 determines that the array 316 also stores "on." In response to this determination, the query processing module 118 then proceeds, via the index ID 404, to gather the positional information of "on" within the document 210, as stored by the array 316. For example, as depicted in FIG. 6B, the query processing module 118 reads positional data, stored by the array 316, that indicates "on" is located within the document 210 at the fourth (4) position. Upon gathering the positional information, the query processing module 118 then proceeds to perform additional procedures, using the metadata 308, for the next search term of the search query 600, "a."

Figure 6C:
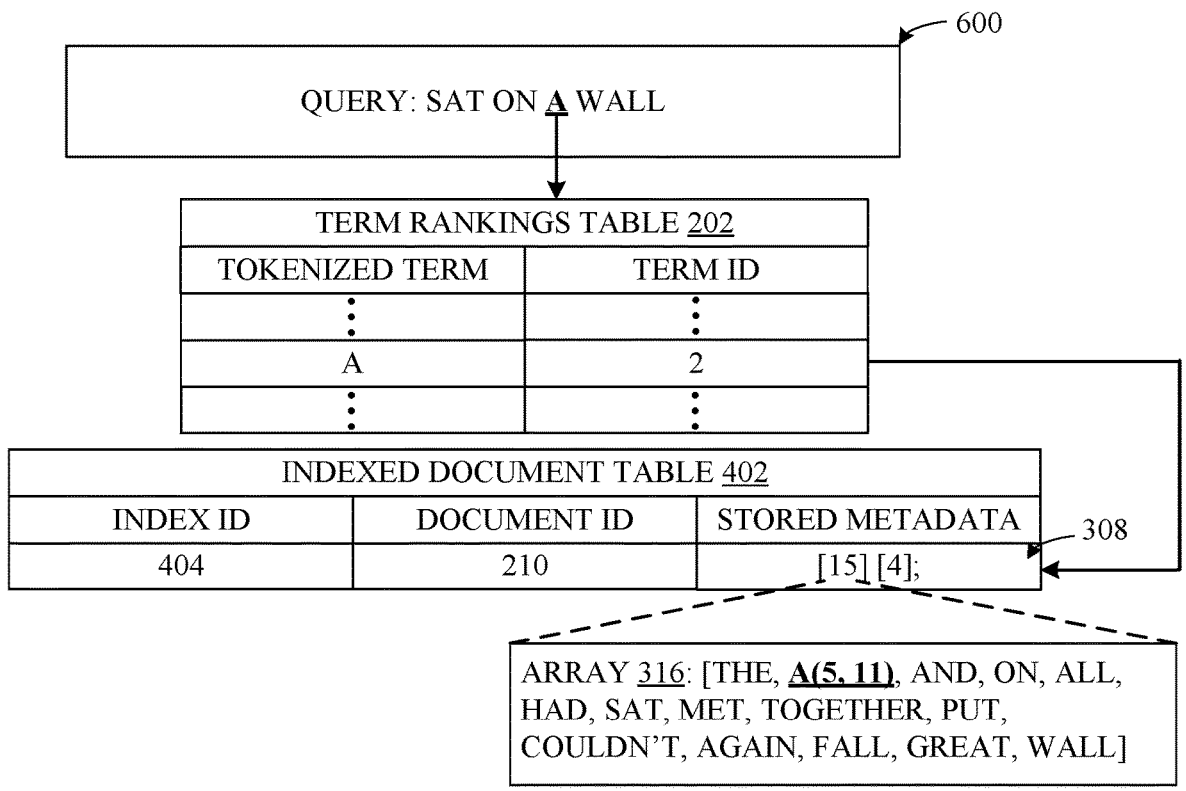

With reference now to FIG. 6C, the query processing module 118 processes the search term "a" by referencing the term rankings table 202 to determine whether "a" is a recognizable ranked tokenized term. As previously depicted in FIG. 2A, "a" is encoded in accordance with a first bit-level. By referencing the term rankings table 202, the query processing module 118 determines that "a" is encoded in accordance with a first bit-level. Accordingly, the query processing module 118 performs a search on the array 316 to determine whether the array 316 stores "a." During traversal of the array 316, the query processing module 118 determines that the array 316 also stores "a." In response to this determination, the query processing module 118 then proceeds to gather, via the index ID 404, the positional information of "a" within the document 210, as stored by the array 316. For example, as depicted in FIG. 6C, the query processing module 118 reads positional data, stored by the array 316, that indicates "a" is located within the document 210 at the fifth (5) and eleventh (11) positions. Upon gathering the positional information, the query processing module 118 then proceeds to perform additional procedures, using the metadata 308, for the next search term of the search query 600, "wall."

Figure 6D:
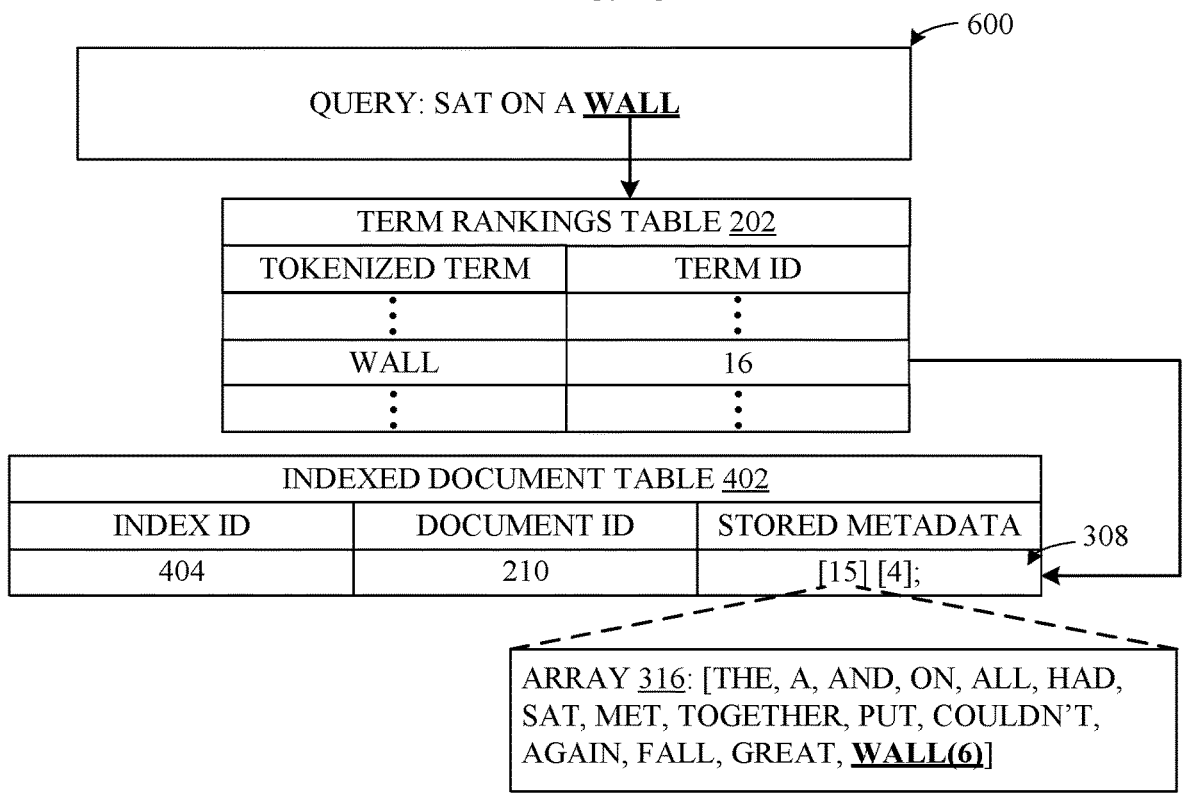

With reference now to FIG. 6D, the query processing module 118 processes the search term "wall" by referencing the term rankings table 202 to determine whether "wall" is a recognizable ranked tokenized term. As previously depicted in FIG. 2A, "wall" is encoded in accordance with a first bit-level. By referencing the term rankings table 202, the query processing module 118 determines that "wall" is encoded in accordance with a first bit-level. Accordingly, with reference to FIG. 6D, the query processing module 118 performs a search on the array 316 to determine whether the array 316 stores "wall." During traversal of the array 316, the query processing module 118 determines that the array 316 also stores "wall." In response to this determination, the query processing module 118 then proceeds, via the index ID 404, to gather the positional information of "wall" within the document 210, as stored by the array 316. For example, as depicted in FIG. 6D, the query processing module 118 reads positional data, stored by the array 316, that indicates "wall" is located within the document 210 at the sixth (6) position.

According to some embodiments, the query processing module 118 can proceed to perform additional procedures, using the indexed document table 402, to locate additional documents that include one or more search terms associated with the search query 600. For instance, the query processing module 118 can perform procedures similar to those depicted in FIGS. 6A-6D for the search term "sat" included in the search query 600, as will now be described in FIG. 6E.

Figure 6E:
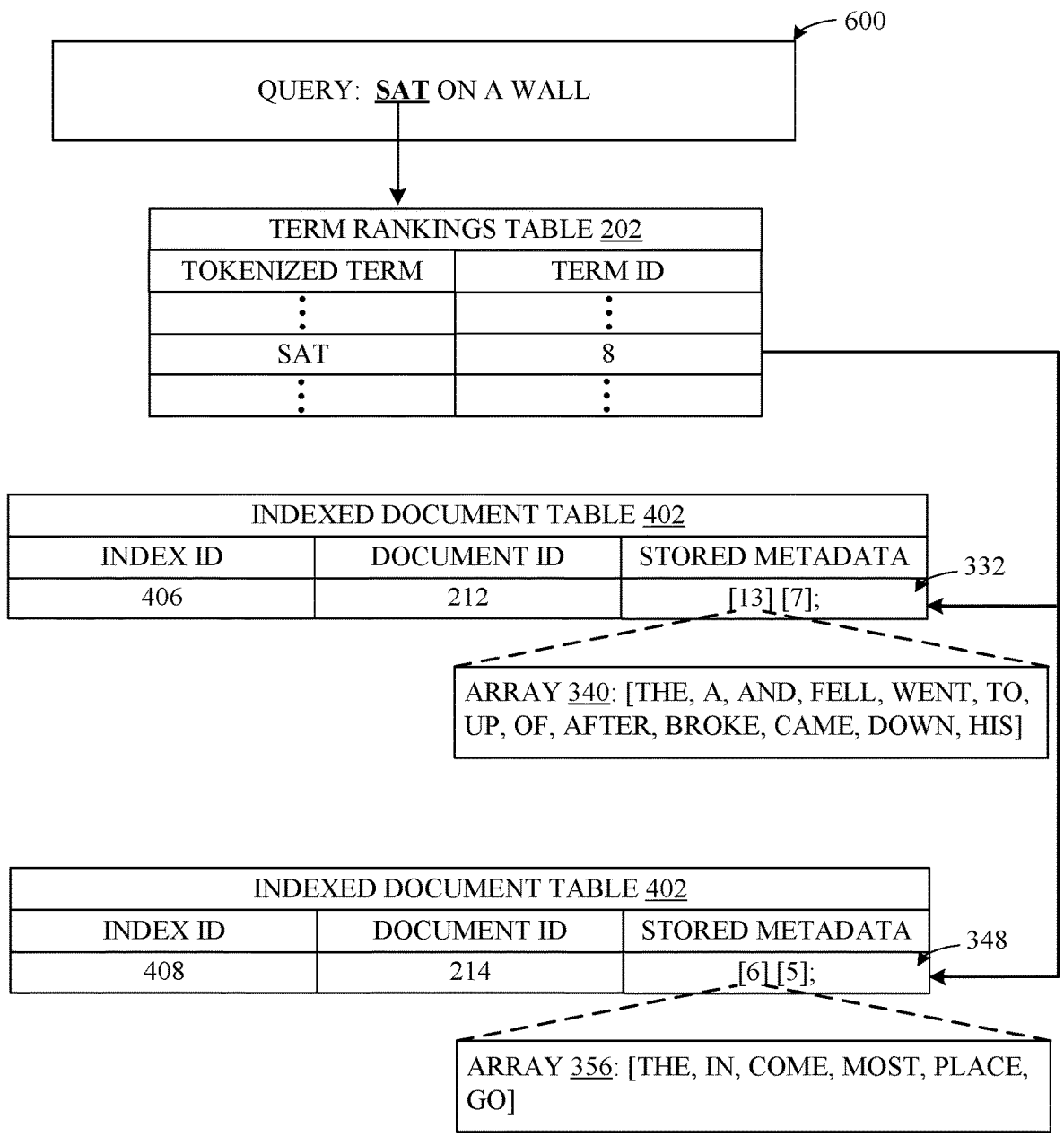

As depicted in FIG. 6E, the query processing module 118 can access the indexed document table 402 and reference the metadata 332 for the document 212 to determine whether the document 212 potentially includes "sat." As illustrated in FIG. 6E, the query processing module 118 recognizes, based on the metadata 332, that the document 212 includes thirteen (13) ranked tokenized terms that are encoded in accordance with a first bit-level. Accordingly, the query processing module 118 performs a search on the array 340 to determine whether the array 340 stores "sat." During traversal of the array 340, the query processing module 118 determines that the array 340 does not store "sat." In response to this determination, the query processing module 118 can then proceed, via the index ID 408, to access the indexed document table 402 and reference the metadata 348 for the document 214 to determine whether the document 214 potentially includes "sat."

As illustrated in FIG. 6E, the query processing module 118 recognizes, based on the metadata 348, that the document 214 includes six (6) ranked tokenized terms that are encoded in accordance with a first bit-level. Accordingly, the query processing module 118 performs a search on the array 356 to determine whether the array 356 stores "sat." During traversal of the array 356 the query processing module 118 determines that, similar to the array 340, the array 356 also does not store "sat." In response to this determination, the query processing module 118 can then proceed to access the indexed document table 402 and reference additional metadata associated with other documents (not depicted) to determine whether a particular document potentially includes "sat" or any one of the other search terms included in the search query 600 (i.e., "on," "a," and/or "wall,").

Provided the query processing module 118 determines that a document, from the remaining set of documents to be searched, includes any one of the search terms included in the search query 600 (i.e., "sat," "on," "a," and/or "wall,"), the query processing module 118 can then proceed to perform procedures similar to those outlined in FIGS. 5A-5G and 6A-6D. Provided the query processing module 118 determines that none of the remaining set of documents include any one of the search terms included in the search query 600, the query processing module 118 can then proceed to display the search results performed for search query 600 within the query results table 502, as will be described now in FIG. 6F.

Figure 6F:
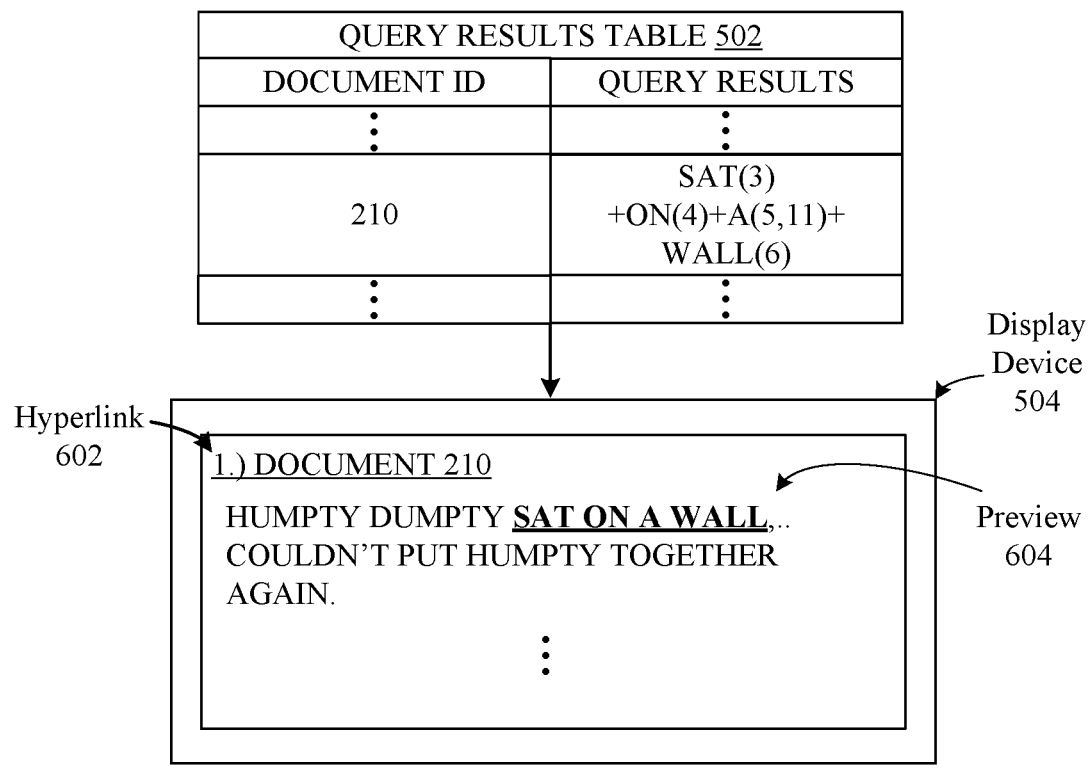

As illustrated in FIG. 6F, the query results table 502 includes the set of relevant search terms identified as being located with the document 210. For instance, the query results table 502 can include each ranked term identified within the document 210 (i.e., "sat," "on," "a," "wall") along with their respective positions within the document 210 (i.e., (3) for "sat," (4) for "on," (5, 11) for "a," and (6) for "wall"). Furthermore, as depicted in FIG. 6F, the results stored within the query results table 502 can be displayed via the display device 504. As previously described herein, the query results table 502 can store data for generating a hyperlink for the document 210 (e.g., hyperlink 602) and associated preview data (e.g., preview 604) which can be displayed via the display device 504.

FIGS. 7A-7I illustrate yet another set of procedures for processing a search query using a set of indexed documents, according to some embodiments. Specifically, FIGS. 7A-7I illustrate how a search query that includes only second bit-level terms can be processed, according to some embodiments. By performing the procedures described in FIGS. 7A-7I, the described embodiments can quickly introspect one or more documents that include less frequently used terms to process a search query with the same speed and efficiency as the procedures described in FIGS. 6A-6F with respect to more frequently-used terms.

Figure 7A:
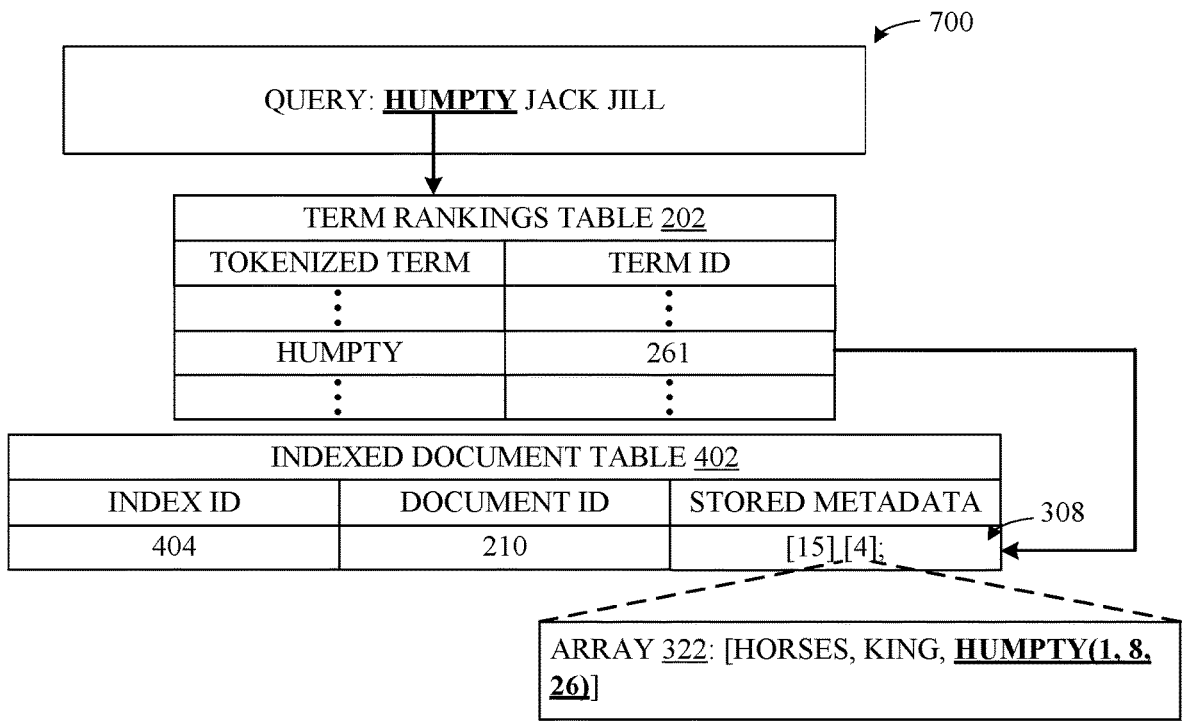

With reference now to FIG. 7A, the computing device 102 can receive a search query 700, inputted from a user, that includes the search terms "Humpty Jack Jill," in which the user seeks to possibly identify nursery rhymes that include the characters Humpty Dumpty, Jack, and Jill. Thus, each search term of the search query 700 includes terms that are generally not present in most documents. Upon receipt of the search query 700, the query processing module 118 can initially process the first search term "Humpty" by referencing the term rankings table 202 to determine whether "Humpty" is a recognizable ranked tokenized term. As previously depicted in FIG. 2B, "Humpty" is encoded in accordance with a second bit-level. By referencing the term rankings table 202, the query processing module 118 determines that "Humpty" is encoded in accordance with a second bit-level. As previously described herein, given that the first search term is determined to be encoded in accordance with a second bit-level, the query processing module 118 can quickly reference the index id that includes the second bit-level search term. For instance, with further reference to FIG. 7A, the query processing module 118 can directly access a document that includes the term "Humpty," such as the document 210 via the index ID 404.

Accordingly, the query processing module 118 then proceeds, via the index ID 404, to gather the positional information of "Humpty" within the document 210, as stored by the array 322. For example, as depicted in FIG. 7A, the query processing module 118 reads positional data, stored by the array 322, that indicates "Humpty" is located within the document 210 at the first (1), eight (8), and twenty-sixth (26) positions. After gathering this positional information, the query processing module 118 then proceeds to perform additional search procedures, using the metadata 308, for next search term of the search query 700, "Jack." In this fashion, the query processing module 118 attempts to provide a through introspection of the document 210 to quickly and efficiently determine how many tanked tokenized terms, encoded in accordance with a second bit-level, are potentially present in document 210 before proceeding to search a different document.

Figure 7B:
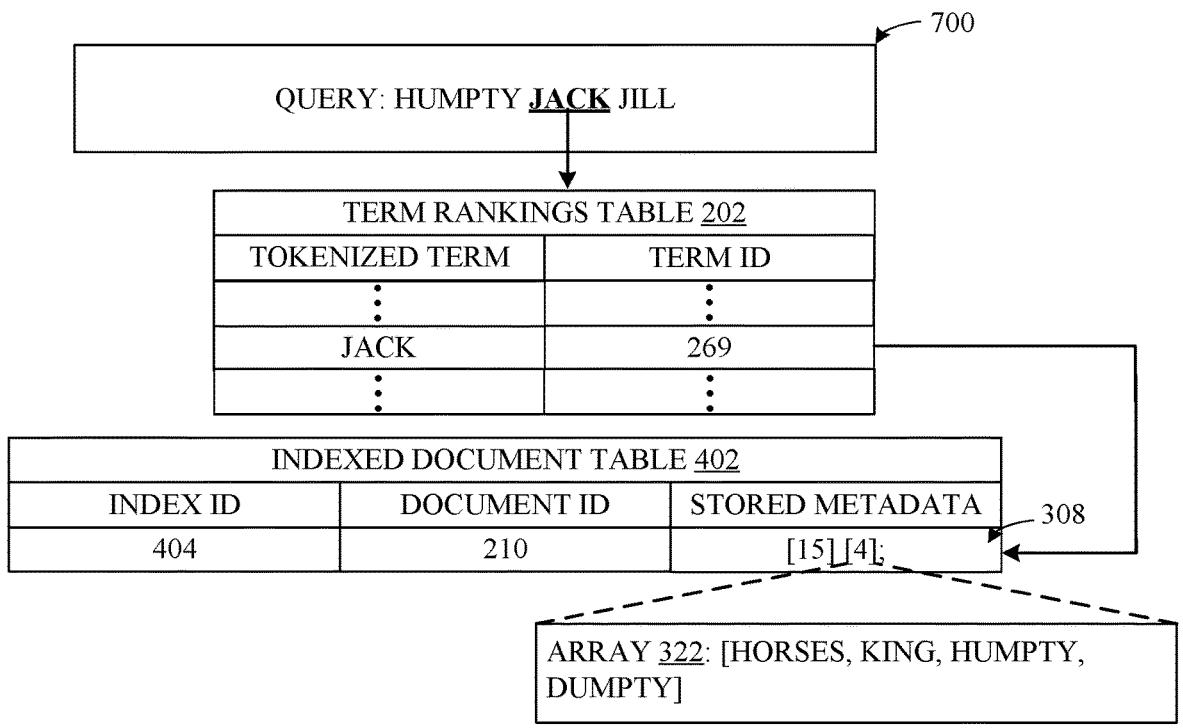

With reference now to FIG. 7B, the query processing module 118 processes the second search term "Jack" by referencing the term rankings table 202 to determine whether "Jack" is a recognizable ranked tokenized term. As previously depicted in FIG. 2B, "Jack" is encoded in accordance with a second bit-level. By referencing the term rankings table 202, the query processing module 118 determines that "Jack" is indeed encoded in accordance with a second bit-level. With further reference to FIG. 7B, the query processing module 118 performs another search on the array 322 to determine whether the array 322 stores "Jack." Upon complete traversal of the array 322, the query processing module 118 determines that the array 322 does not store "Jack." In response to this determination, the query processing module 118 then proceeds to process the next search term of the search query 700, "Jill," as will now be described in FIG. 7C.

Figure 7C:
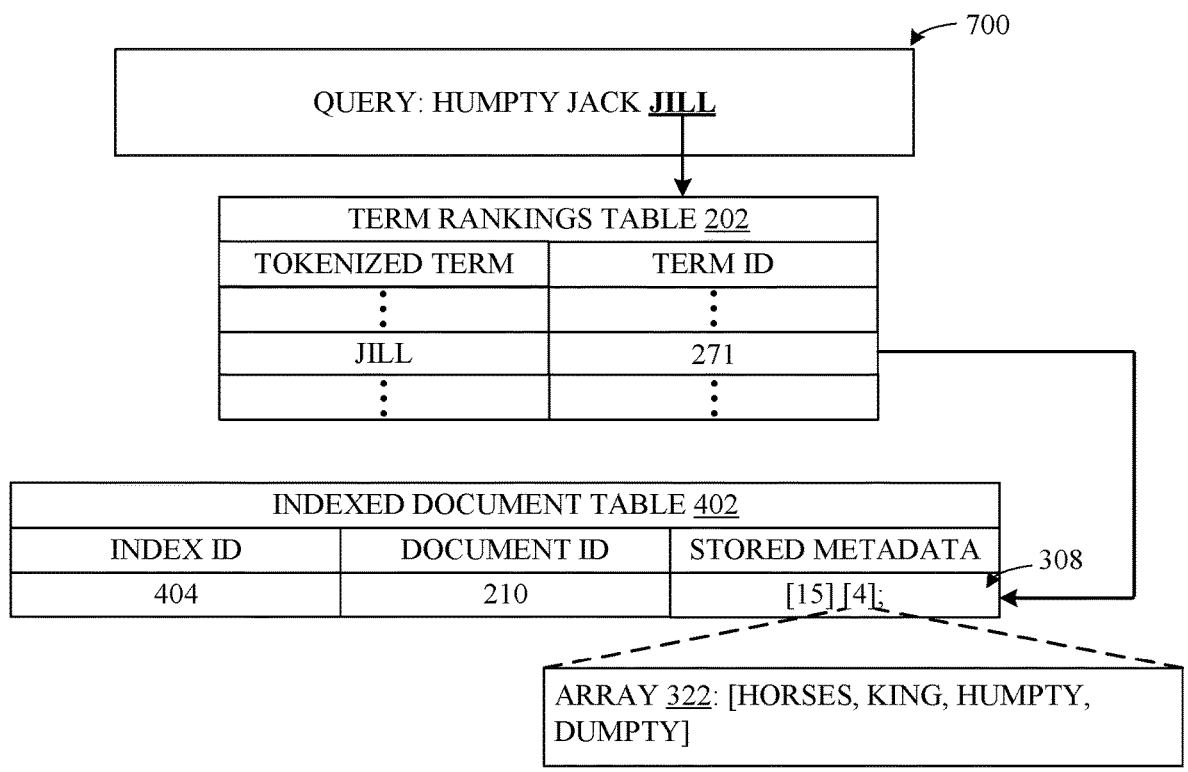

As illustrated in FIG. 7C, the query processing module 118 processes "Jill" by referencing the term rankings table 202 to determine whether "Jill" is a recognizable ranked tokenized term. As previously depicted in FIG. 2B, "Jill" is encoded in accordance with a second bit-level. By referencing the term rankings table 202, the query processing module 118 determines that "Jill" is also encoded in accordance with a second bit-level. The query processing module 118 performs another search on the array 322 to determine whether the array 322 stores "Jill." Upon complete traversal of the array 322, the query processing module 118 determines that the array 322 also does not store "Jill." In response to this determination, the query processing module 118 then proceeds to perform additional procedures to determine whether other documents accessible to the computing device 102, such as the documents 212 and 214, potentially store one or more terms associated with the search query 700. For example, as illustrated in FIG. 7D, the query processing module 118 can proceed to access the indexed document table 402 and reference, via the index ID 406, the metadata 332 to determine whether the document 212 potentially includes "Humpty."

As previously described herein, the query processing module 118 can recognize that, based on the metadata 332, the document 212 includes seven (7) ranked tokenized terms that are encoded in accordance with a second bit-level. Accordingly, the query processing module 118 performs a search on the array 342 to determine whether the array 342 stores "Humpty." Upon complete traversal of the array 342, the query processing module 118 determines that the array 342 does not store "Humpty." In response to this determination, the query processing module 118 proceeds to access the indexed document table 402 and reference, via the index ID 408, the metadata 348 to determine whether the document 214 potentially includes "Humpty." As previously described herein, the query processing module 118 can recognize that, based on the metadata 348, the document 214 includes five (5) ranked tokenized terms that are encoded in accordance with a second bit-level.

Figure 7D:
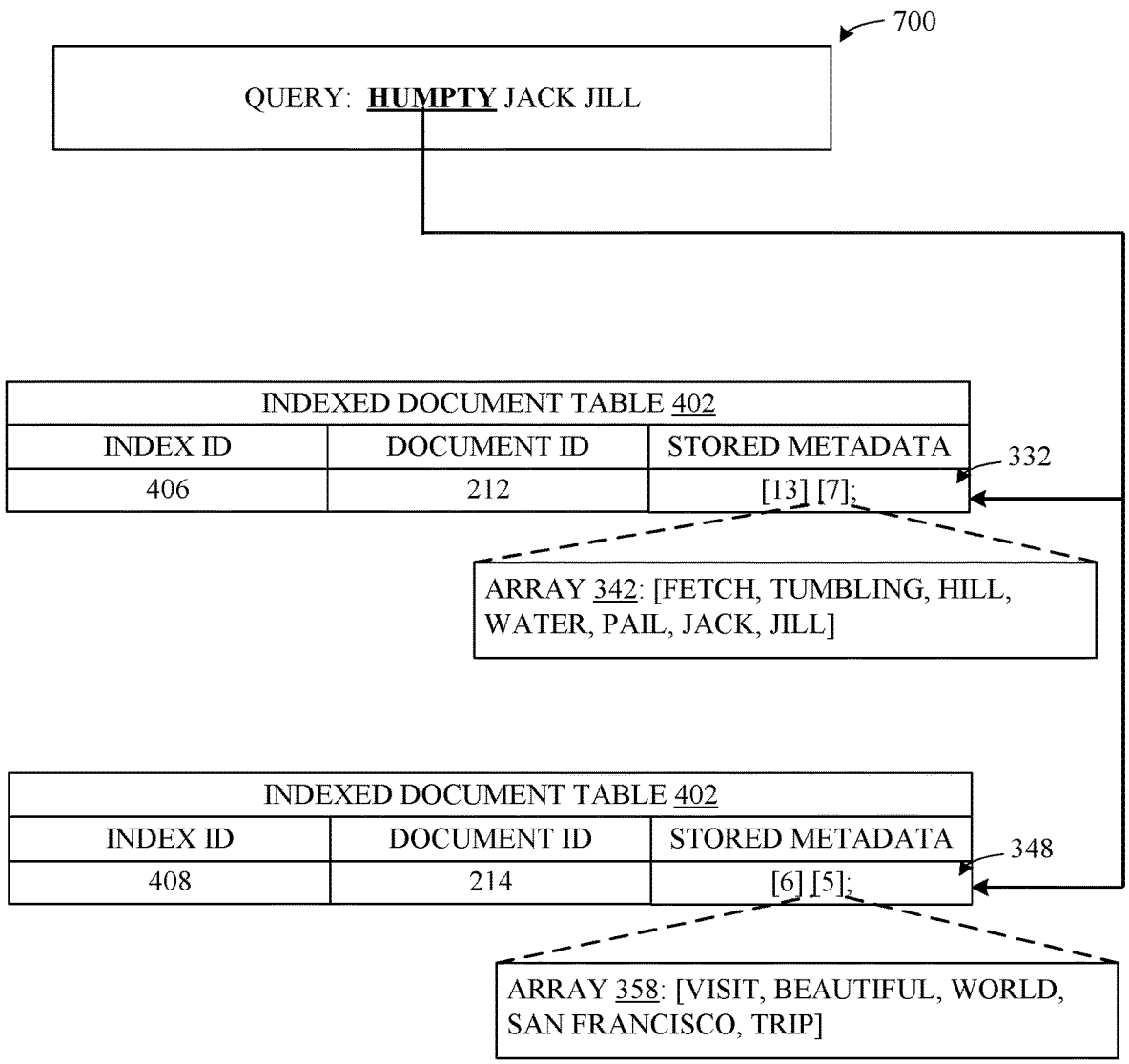

Accordingly, the query processing module 118 performs a search on the array 358 to determine whether the array 358 stores "Humpty." Upon complete traversal of the array 358, the query processing module 118 determines that the array 358 also does not store "Humpty." In this fashion, the query processing module 118 can continuously perform procedures similar to those depicted in FIG. 7D for each additional document to determine whether a document includes "Humpty." Provided the query processing module 118 determines that a document, from the remaining set of documents to be searched, includes "Humpty," the query processing module 118 can then proceed to perform procedures similar to those described in FIG. 7A. Provided the query processing module 118 determines that none of the remaining documents include "Humpty," the query processing module 118 can then proceed to determine whether the document 212 potentially includes the next search term, "Jack," as will now be described in FIG. 7E.

Figure 7E:
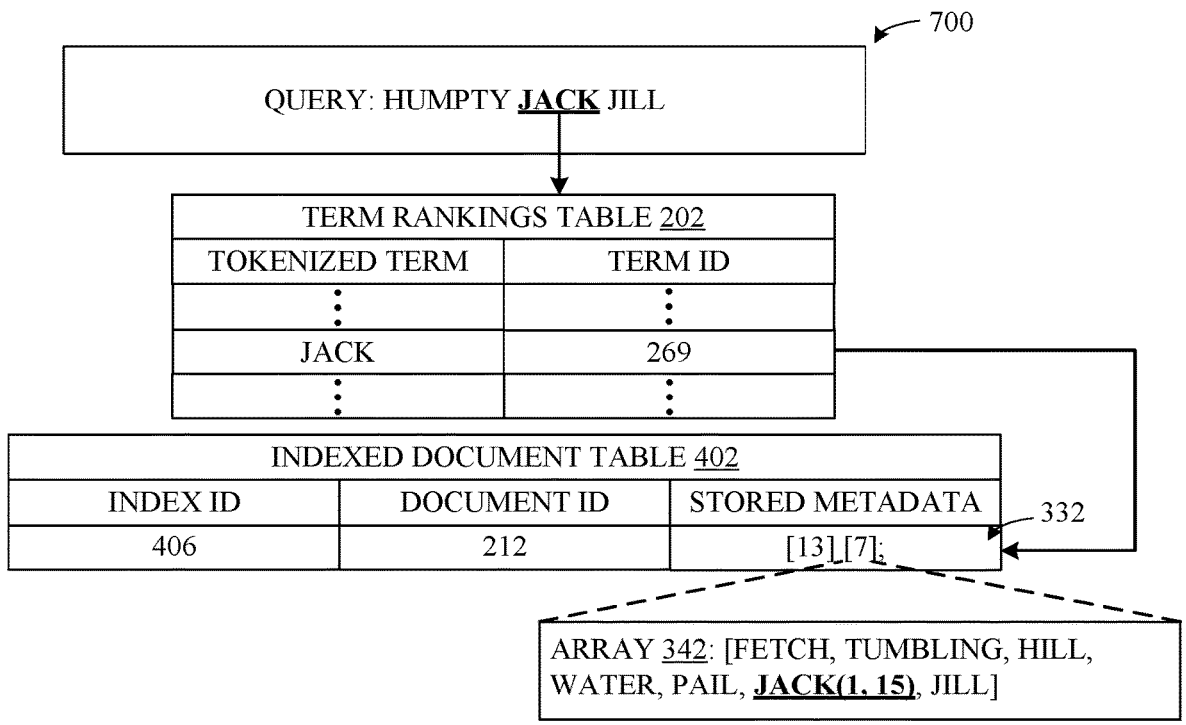

As illustrated in FIG. 7E, the query processing module 118 can proceed to access the indexed document table 402 and reference, via the index ID 406, the metadata 332 to determine whether the document 212 potentially includes "Jack." As previously described herein, the query processing module 118 can recognize that, based on the metadata 332, the document 212 includes seven (7) ranked tokenized terms that are encoded in accordance with a second bit-level. Accordingly, the query processing module 118 performs a search on the array storing the ranked terms associated with the second bit-level, the array 342, to determine whether the array 342 stores "Jack." During traversal of the array 342, the query processing module 118 determines that the array 342 does, in fact, store "Jack." In response to this determination, the query processing module 118 then proceeds, via the index ID 406, to gather the positional information of "Jack" within the document 212, as stored by the array 342. For example, as depicted in FIG. 7E, the query processing module 118 reads positional data, stored by the array 342, that indicates "Jack" is located within the document 212 at the first (1) and fifteenth (15) positions. After gathering this positional information, the query processing module 118 then proceeds to perform additional search procedures, using the metadata 332, for next search term of the search query 700, "Jill," as will now be described in FIG. 7F.

Figure 7F:
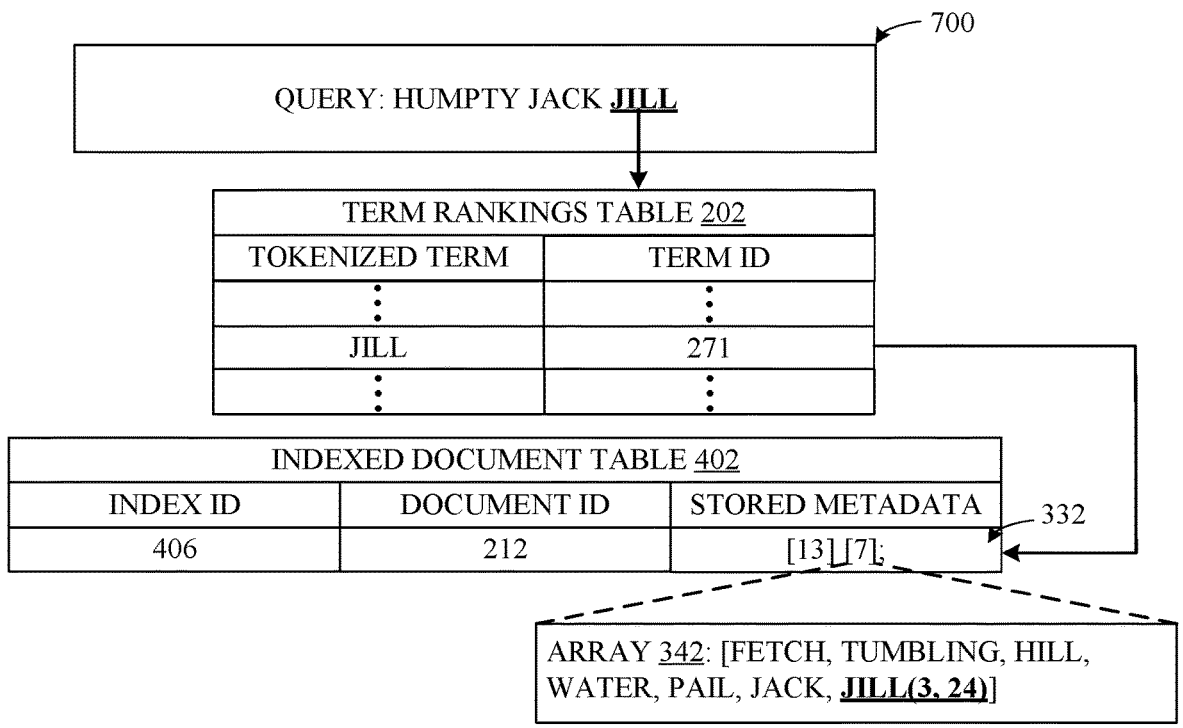

As illustrated in FIG. 7F, the query processing module 118 can proceed to access the indexed document table 402 and reference, via the index ID 406, the metadata 332 to determine whether the document 212 potentially includes "Jill." As previously described herein, the query processing module 118 can recognize that, based on the metadata 332, the document 212 includes seven (7) ranked tokenized terms that are encoded in accordance with a second bit-level. Accordingly, the query processing module 118 performs a search on the array storing the ranked terms associated with the second bit-level, the array 342, to determine whether the array 342 stores "Jill."

During traversal of the array 342, the query processing module 118 determines that the array 342 also stores "Jill." In response to this determination, the query processing module 118 then proceeds, via the index ID 406, to gather the positional information of "Jill" within the document 212, as stored by the array 342. For example, as depicted in FIG. 7F, the query processing module 118 reads positional data, stored by the array 342, that indicates "Jill" is located within the document 212 at the third (3) and twenty-fourth (24) positions. After gathering this positional information, the query processing module 118 then proceeds to perform additional search procedures on additional documents, such as the document 214, to continue to identify any documents that may include the search term "Jack," as will now be described in FIG. 7G.

Figure 7G:
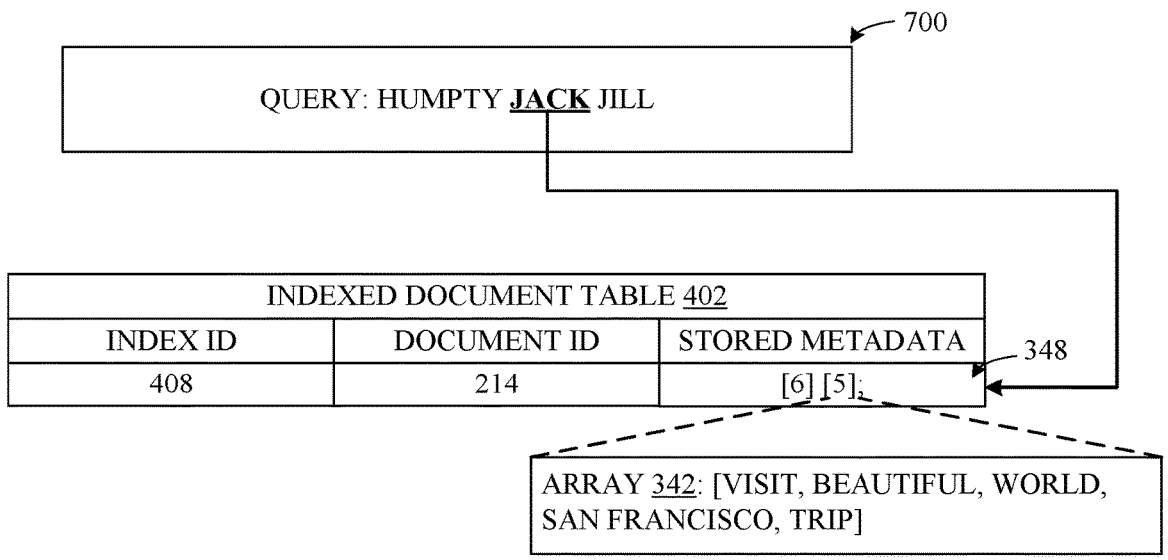
Figure 7H:
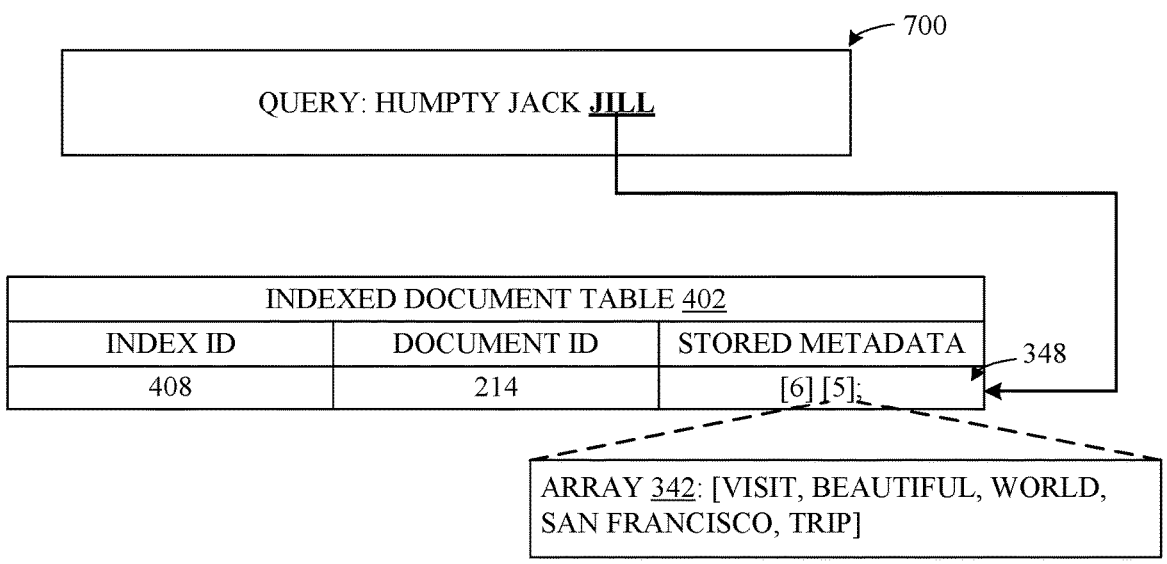
Figure 71:
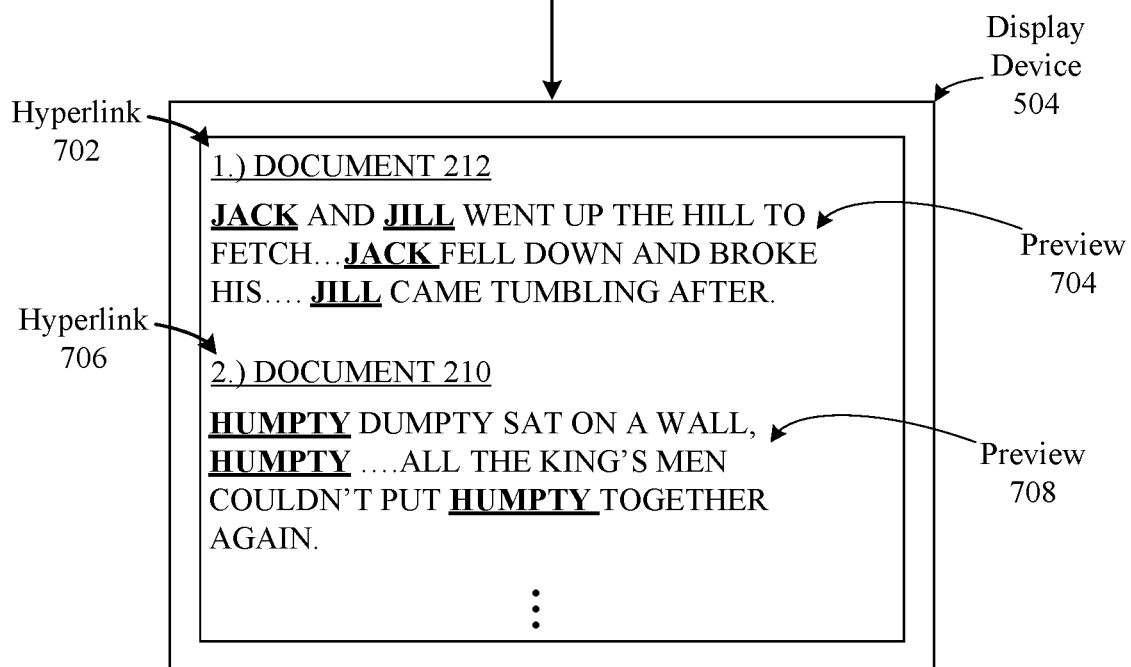

For instance, as illustrated in FIG. 7G, the query processing module 118 can proceed to access the indexed document table 402 and reference, via the index ID 408, the metadata 348 to determine whether the document 214 potentially includes "Jack." As previously described herein, the query processing module 118 can recognize that, based on the metadata 348, the document 214 includes five (5) ranked tokenized terms that are encoded in accordance with a second bit-level. Accordingly, the query processing module 118 performs a search on the array 342 to determine whether the array 342 stores "Jack." Upon complete traversal of the array 342, the query processing module 118 determines that the array 342 does not store "Jack." In response to this determination, the query processing module 118 proceeds to access the indexed document table 402 and reference, via the index ID 408, the metadata 348 to determine whether the document 214 potentially includes "Jill." As illustrated in FIG. 7H, the query processing module 118 performs a search on the array 342 to determine whether the array 342 stores "Jill." Upon complete traversal of the array 342, the query processing module 118 determines that the array 342 also does not store "Jill."

Provided the query processing module 118 determines that a document, from the remaining set of documents to be searched, includes any one of the search terms included in the search query 700 (i.e., "Humpty," "Jack," and/or "Jill,"), the query processing module 118 can then proceed to perform procedures similar to those described in FIGS. 5A-5E, 6A-6D, 7A, 7E-7F. Provided the query processing module 118 determines that none of the remaining set of documents include any one of the search terms included in the search query 700, the query processing module 118 can then proceed to display the search results, performed for search query 700, that are stored within the query results table 502, as will be described now in FIG. 7I.

As illustrated in FIG. 7I, the query results table 502 can include the set of relevant search terms identified as being located with the documents 210 and 212. For instance, the query results table 502 can include each ranked term identified within the documents 210 and 212 (i.e., "Humpty," "Jack," and "Jill") along with the respective positions of each term within the documents 210 and 212 (i.e., (1, 8, 26) for "Humpty," (1, 15) for "Jack," and (3, 24) for "Jill," respectively). Furthermore, as depicted in FIG. 7I, the results stored within the query results table 502 can be displayed via the display device 504. As described previously herein, the query results table 502 can store data for generating a hyperlink for each of the documents 210 and 212 (e.g., hyperlinks 702 and 706) and associated preview data (e.g., preview 704 and 708, respectively), which can be displayed via the display device 504.

Figure 8:
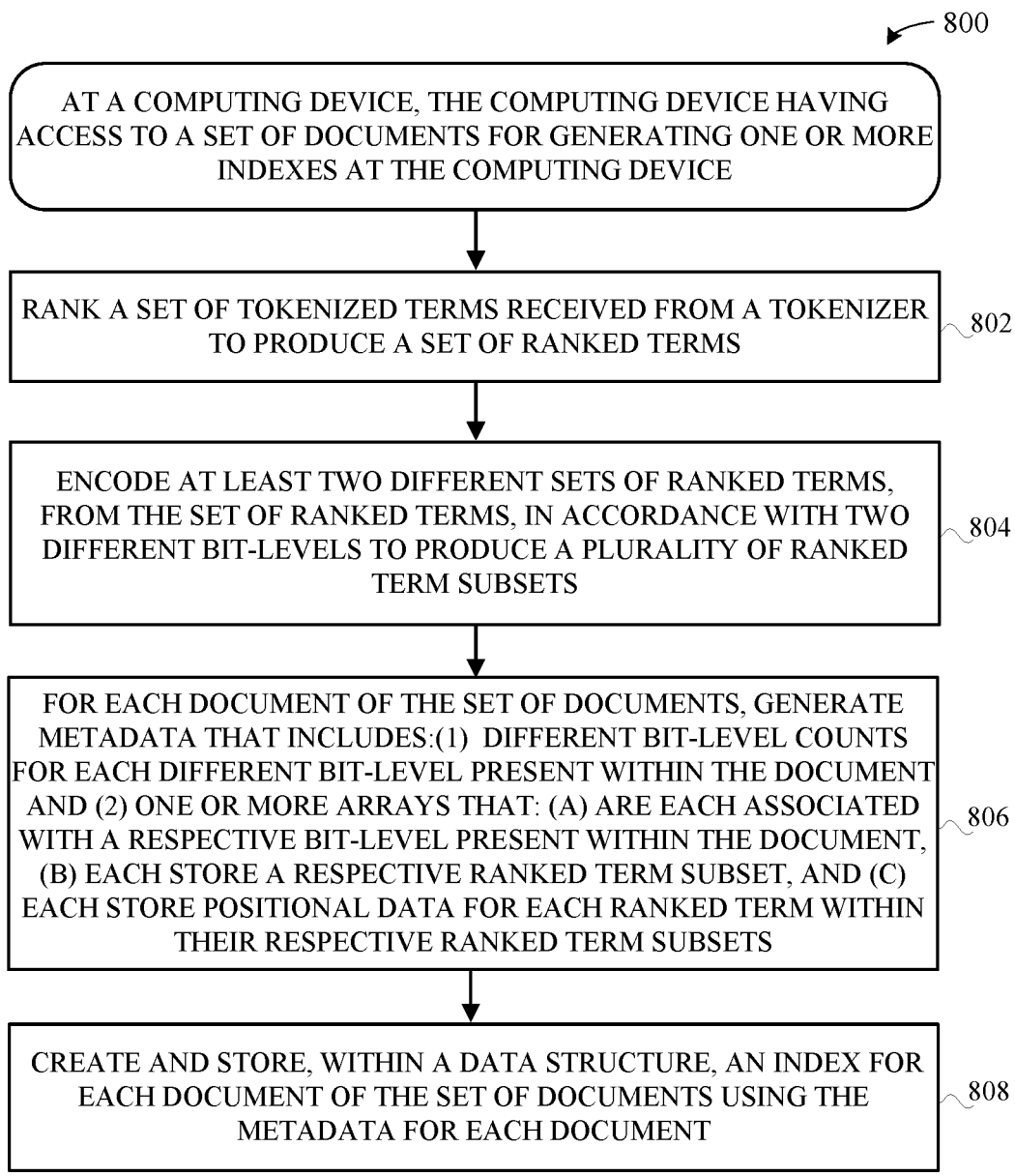
FIG. 8 illustrates a method for indexing a set of documents, according to some embodiments.

FIG. 8 illustrates a method 800 for indexing a set of documents, according to some embodiments. As shown in FIG. 8, the method 800 begins at step 802 at a computing device (e.g., the computing device 102) having access to a set of documents for generating one or more indexes at the computing device, where a term ranking module ranks a set of tokenized terms received from a tokenizer to produce a set of ranked terms. Next at step 804, a term encoding module encodes at least two different sets of ranked terms, from the set of ranked terms, in accordance with two different bit-levels to produce a plurality of ranked term subsets. Next at step 806, for each document of the set of documents, a metadata generation module generates metadata that includes: (1) different bit-level counts for each different bit-level present within the document and (2) one or more arrays that: (A) are each associated with a respective bit-level present within the document, (B) each store a respective ranked term subset, and (C) each store positional data for each ranked term within their respective ranked terms subsets. Next, at step 808, an indexing module creates and stores, within a data structure, an index for each document of the set of documents using the metadata, generated by the metadata generation module, for each document.

FIGS. 9A-9E illustrates a method 900 for processing a search query using a set of indexed documents, according to some embodiments. As showing in FIG. 9A, the method 900 begins at step 902 at a computing device (e.g., the computing device 102) having access to a set of documents for processing a search query, where a query processing module receives the search query containing one or more search terms and determines a bit-level associated with a first term of the search query. Next, at step 904, the query processing module accesses a document from the set of documents and references a bit-level count, associated with the bit-level, for the document. Next, at step 906, the query processing module determines whether the bit-level count is greater than one. If the query processing module determines that the bit-level count is greater than one, then the query processing module performs a search of an array, storing one or more ranked terms, corresponding to the bit-level to locate the first term, as detailed at step 908. Otherwise, the query processing module determines whether there is an additional document accessible to the computing device for processing the search query, as detailed at step 930 in FIG. 9D.

Next, at step 910, the query processing module determines whether the first term was located within the array. If the query processing module determines that the first term was located within the array, then the query processing module gathers positional information for the located term, as stored by the array, and stores the results within a query results table, as detailed at step 912 in FIG. 9B. Otherwise, the query processing module determines whether there is an additional document accessible to the computing device for processing the search query, as detailed at step 930 in FIG. 9D.

Figure 9A:
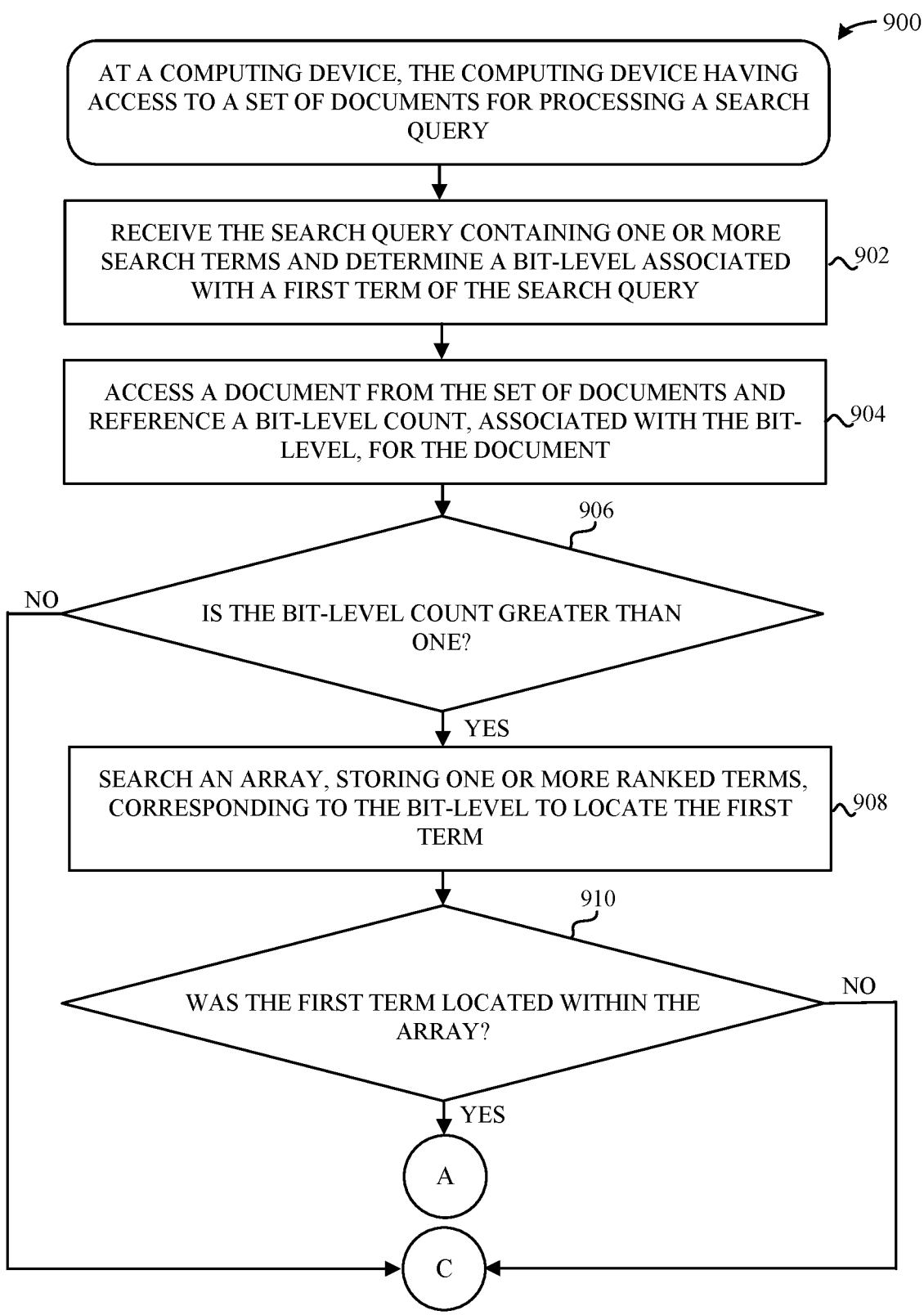
FIGS. 9A-9E illustrate a method for processing a search query using a set of indexed documents, according to some embodiments.
Figure 9B:
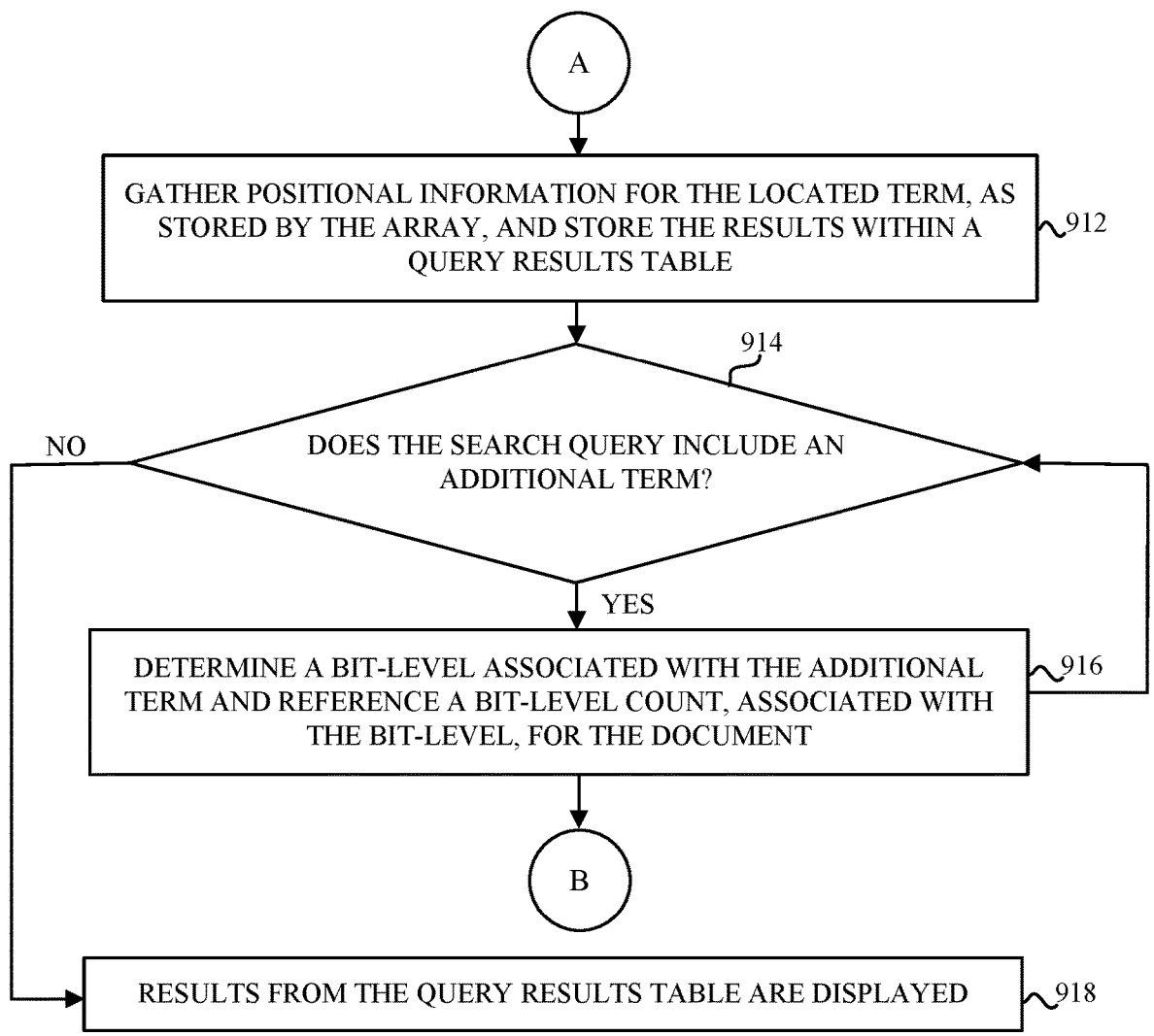

Next, at step 914 in FIG. 9B, the query processing module determines whether the search query includes an additional term to search. If the query processing module determines that the search query includes an additional term to search, then the query processing module determines a bit-level associated with the additional term and references a bit-level count, associated with the bit-level, for the document, as detailed at step 916. Otherwise, results from the query results table are displayed, as detailed at step 918 in FIG. 9B.

Figure 9C:
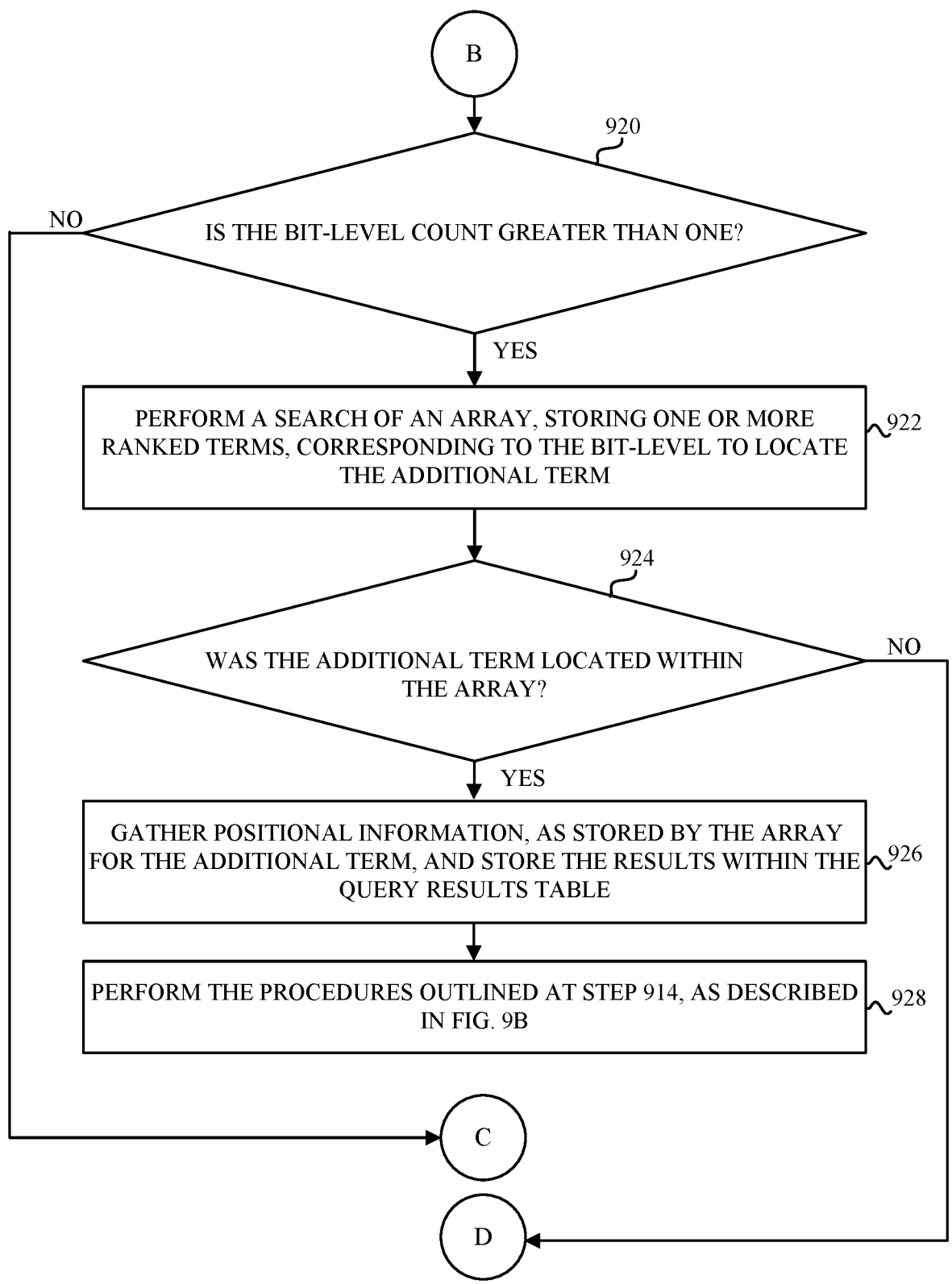
Figure 9D:
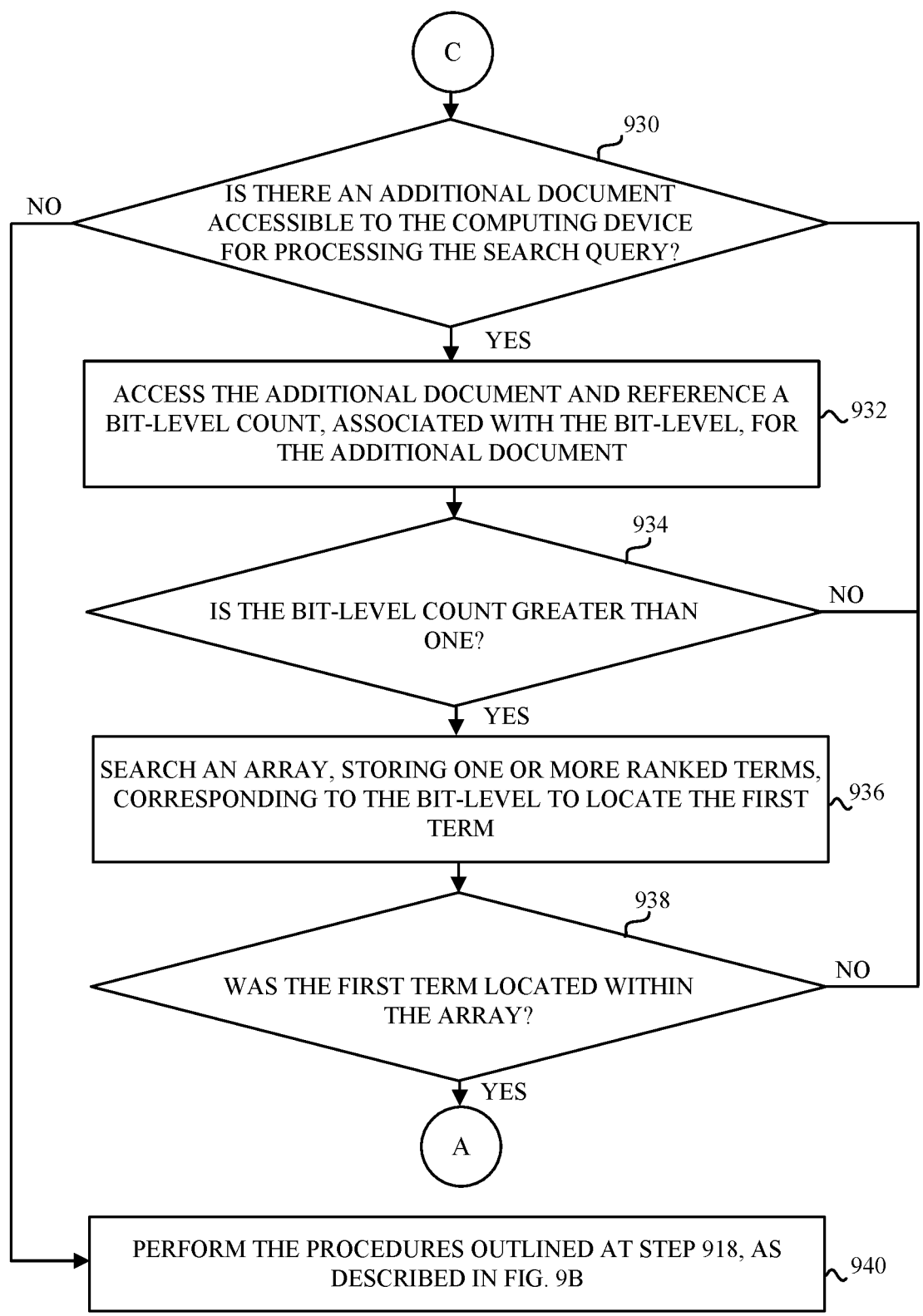

Next, at step 920 in FIG. 9C, the query processing module determines whether the bit-level count is greater than one. If the query processing module determines that the bit-level count is greater than one, then the query processing module performs a search of an array, storing one or more ranked terms, corresponding to the bit-level to locate the additional term, as detailed at step 922. Otherwise, the query processing module determines whether there is an additional document accessible to the computing device for processing the search query, as detailed at step 930 in FIG. 9D.

Next, at step 924, the query processing module determines whether the additional term is located within the array. If the additional term is located within the array, then the query processing module gathers positional information, as stored by the array for the additional term, and stores the results within the query results table, as detailed at step 926. Otherwise, the query processing module determines whether there is an additional document accessible to the computing device for processing the search query, as detailed at step 940 in FIG. 9E.

Next, at step 928, the query processing module performs the procedures outlined at step 914 in the manner described in FIG. 9B. At step 930 in FIG. 9D, the query processing module determines whether there is an additional document accessible to the computing device for processing the search query. If the query processing module determines that an additional document is accessible to the computing device, then the query processing module accesses the additional document and references a bit-level count, associated with the bit-level, for the additional document, as detailed at step 932. Otherwise, the query processing module determines performs the procedures outlined at step 918, in the manner described in FIG. 9B, as detailed at step 940.

Next, at step 934, the query processing module determines whether the bit-level count is greater than one. If the bit-level count is greater than one, then the query processing module performs a search of an array, storing one or more ranked terms, corresponding to the bit-level to locate the first term, as detailed at step 936. Otherwise, the query processing module determines whether there is an additional document accessible to the computing device for processing the search query, as detailed at step 930. Next, at step 938, the query processing module determines whether the first term was located within the array. If the first term was located within the array, then the query processing module gathers positional information for the located term, as stored by the array, and stores the results within a query results table, as detailed at step 912 in FIG. 9B. Otherwise, the query processing module determines whether there is an additional document accessible to the computing device for processing the search query, as detailed at step 930. Next, at step 940, the query processing module performs the procedures outlined at step 918, in the manner described in FIG. 9B.

Figure 9E:
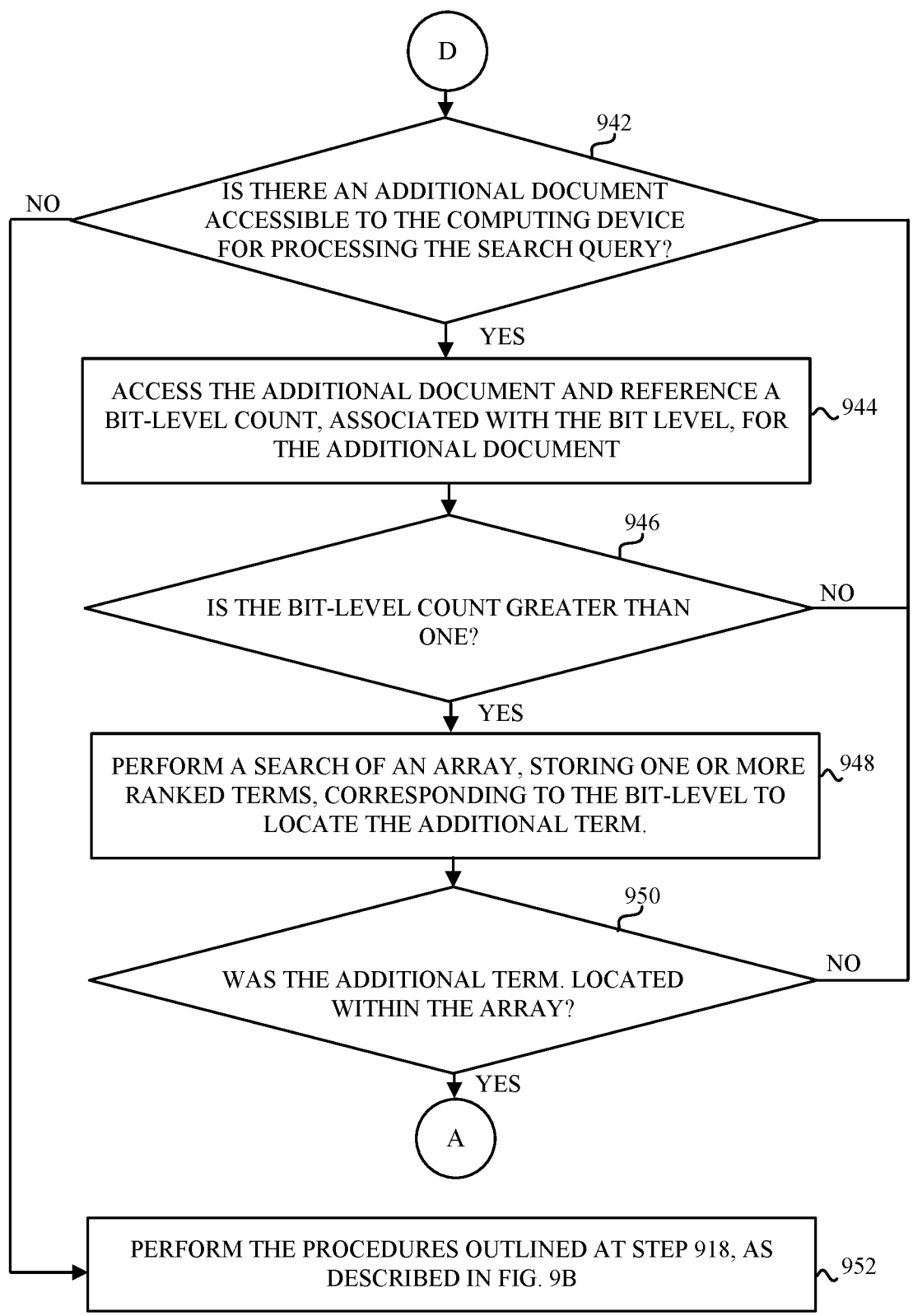

Next, at step 942 in FIG. 9E, the query processing module determines whether there is an additional document accessible to the computing device for processing the search query. If the query processing module determines that an additional document is accessible to the computing device, then the query processing module accesses the additional document and references a bit-level count, associated with the bit-level, for the additional document, as detailed at step 944. Otherwise, the query processing module performs the procedures outlined at step 918, in the manner described in FIG. 9B, as detailed at step 952.

Next, at step 946, the query processing module determines whether the bit-level count is greater than one. If the bit-level count is greater than one, then the query processing module performs a search of an array, storing one or more ranked terms, corresponding to the bit-level to locate the additional term, as detailed at step 948. Otherwise, the query processing module determines whether there is an additional document accessible to the computing device for processing the search query, as detailed at step 930. Next, at step 950, the query processing module determines whether the additional term was located within the array. If the additional term was located within the array, then the query processing module gathers positional information for the located term, as stored by the array, and stores the results within a query results table, as detailed at step 912 in FIG. 9B. Otherwise, the query processing module determines whether there is an additional document accessible to the computing device for processing the search query, as detailed at step 942. Next, at step 950, the query processing module performs the procedures outlined at step 918, in the manner described in FIG. 9B.

It is noted that this disclosure primarily involves the term ranking module 110, the term encoding module 112, the metadata generation module 114, the indexing module 116, and the query processing module 118 carrying out the various techniques described herein for the purpose of unified language and simplification. However, it is noted that other entities can be configured to carry out these techniques without departing from this disclosure. For example, other software components (e.g., the OS 108, applications, firmware(s), etc.) executing on the computing device 102 can be configured to carry out all or a portion of the techniques described herein without departing from the scope of this disclosure. Moreover, other hardware components included in the computing device 102 can be configured to carry out all or a portion of the techniques described herein without departing from the scope of this disclosure. Further, all or a portion of the techniques described herein can be offloaded to another computing device without departing from the scope of this disclosure.

FIG. 10 illustrates a detailed view of a computing device 1000 that can be used to implement the various components described herein, according to some embodiments. In particular, the detailed view illustrates various components that can be included in the computing device 102 illustrated in FIG. 1. As shown in FIG. 10, the computing device 1000 can include a processor 1002 that represents a microprocessor or controller for controlling the overall operation of the computing device 1000. The computing device 1000 can also include a user input device 1008 that allows a user of the computing device 1000 to interact with the computing device 1000. For example, the user input device 1008 can take a variety of forms, such as a button, keypad, dial, touch screen, audio input interface, visual/image capture input interface, input in the form of sensor data, and so on. Still further, the computing device 1000 can include a display 1010 that can be controlled by the processor 1002 to display information to the user. A data bus 1016 can facilitate data transfer between at least a storage device 1040, the processor 1002, and a controller 1013. The controller 1013 can be used to interface with and control different equipment through an equipment control bus 1014. The computing device 1000 can also include a network/bus interface 1011 that couples to a data link 1012. In the case of a wireless connection, the network/bus interface 1011 can include a wireless transceiver.

As noted above, the computing device 1000 also include the storage device 1040, which can comprise a single disk or a collection of disks (e.g., hard drives), and includes a storage management module that manages one or more partitions within the storage device 1040. In some embodiments, storage device 1040 can include flash memory, semiconductor (solid state) memory or the like. The computing device 1000 can also include a Random-Access Memory (RAM) 1020 and a Read-Only Memory (ROM) 1022. The ROM 1022 can store programs, utilities or processes to be executed in a non-volatile manner. The RAM 1020 can provide volatile data storage, and stores instructions related to the operation of applications executing on the computing device 102, including the term ranking module 110, the term encoding module 112, the metadata generation module 114, the indexing module 116, and the query processing module 118.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for indexing a set of documents stored on at least one computing device, the method comprising, at the at least one computing device:
   creating a plurality of ranked term subsets, wherein each ranked term subset comprises one or more terms assigned a ranking based on a historical occurrence of each term, and wherein each ranked term subset is encoded in accordance with an allocated bit size; and
   generating an index for a document by:
   (i) identifying each ranked term subset from the plurality of ranked term subsets with at least one ranked term within the document;
   (ii) generating one or more arrays to store each ranked term subset identified; and
   (iii) embedding metadata within the document, wherein the metadata comprises at least:
   (i) the one or more arrays, wherein the one or more arrays comprise position information of each ranked term within the document, wherein the position information comprises an offset value of the ranked term; and
   (ii) one or more counts corresponding to the one or more arrays, wherein each count represents a number of ranked terms stored by a respective array of the one or more arrays.

2. The method of claim 1, wherein assigning the ranking further comprises receiving the one or more terms from a tokenizer, wherein the one or more terms includes a multiple-word term.

3. The method of claim 1, wherein creating the plurality of subsets further comprises:
   encoding the plurality of ranked term subsets using different bit sizes.

4. The method of claim 1, wherein generating the index further comprises:
   generating a data structure to store a respective index for each document of the set of documents.

5. The method of claim 4, wherein each respective index comprises at least:
   (i) a document identifier for each document of the set of documents; and
   (ii) the one or more ranked terms.

6. The method of claim 4, wherein the data structure is stored remotely from the at least one computing device.

7. At least one computing device configured to index a set of documents accessible to the at least one computing device, the at least one computing device comprising:
   at least one processor; and
   at least one memory configured to store instructions that, when executed by the at least one processor, cause the at least one computing device to:
   create a plurality of ranked term subsets, wherein each ranked term subset comprises one or more terms assigned a ranking based on a historical occurrence of each term, and wherein each ranked term subset is encoded in accordance with an allocated bit size; and
generate an index for a document by:
(i) identifying each ranked term subset from the plurality of ranked term subsets with at least one ranked term within the document;
(ii) generating one or more arrays to store each ranked term subset identified; and
(iii) embedding metadata within the document, wherein the metadata comprises at least:
(i) the one or more arrays, wherein the one or more arrays comprise position information of each ranked term within the document, wherein the position information comprises an offset value of the ranked term; and
(ii) one or more counts corresponding to the one or more arrays, wherein each count represents a number of ranked terms stored by a respective array of the one or more arrays.

8. The at least one computing device of claim 7, wherein the at least one processor further causes the at least one computing device to receive the one or more terms from a tokenizer, wherein the one or more terms includes a multiple-word term.

9. The at least one computing device of claim 7, wherein the at least one processor further causes the at least one computing device to encode the plurality of ranked term subsets using different bit sizes.

10. The at least one computing device of claim 7, wherein the at least one processor further causes the at least one computing device to generate a data structure to store a respective index for each document of the set of documents.

11. The at least one computing device of claim 10, wherein each respective index comprises at least:
(i) a document identifier for each document of the set of documents; and
(ii) the one or more ranked terms.

12. The at least one computing device of claim 10, wherein the data structure is stored remotely from the at least one computing device.

13. A non-transitory machine-readable medium storing instructions which, when executed by one or more processors of a computing device to query an indexed set of documents stored on at least one computing device, cause the computing device to perform operations comprising:
receiving a query comprising one or more ranked terms, wherein the one or more terms are ranked based on a historical occurrence of a set of terms;
accessing a data structure based at least in part on receipt of the query, wherein the data structure includes:
a document identifier for each document of the indexed set of documents, wherein each document comprises:
metadata embedded within the document, wherein the metadata includes:
(i) at least one array that stores one or more ranked terms from a respective ranked term subset, from a plurality of ranked term subsets, identified with at least one ranked term within the document, wherein each ranked term subset from the plurality of ranked term subsets is a different subset of ranked terms and each ranked term subset is encoded in accordance with an allocated bit size, wherein the at least one array comprises position information of each ranked term within the document, wherein the position information comprises an offset value of the ranked term; and
(ii) one or more counts corresponding to the least one array, wherein each count represents a number of ranked terms stored by the least one array; and
at least one ranked term identified within each document of the indexed set of documents is based at least in part on a particular ranked term subset; and
selecting, from the data structure, a subset of the indexed set of documents, wherein the subset of the indexed set of documents includes: (i) one or more document identifiers, and (ii) the at least one ranked term matching the query.

14. The non-transitory machine-readable medium of claim 13, wherein receiving the query further comprises receiving the one or more ranked terms from a tokenizer, wherein the one or more terms includes a multiple-word term.

15. The non-transitory machine-readable medium of claim 13, wherein accessing the data structure further comprises:
encoding each ranked term subset of the plurality of ranked term subsets in accordance with different bit sizes.

16. The non-transitory machine-readable medium of claim 13, wherein the data structure is stored remotely from the at least one computing device.

17. The non-transitory machine-readable medium of claim 13, wherein the one or more counts includes at least one of: a first bit-level count, a second bit-level count, or a third bit-level count.

* * * * *